(12) United States Patent  
Kim

(10) Patent No.: US 9,195,960 B2  
(45) Date of Patent: Nov. 24, 2015

(54) MOBILE TERMINAL AND CONTROL METHOD THEREOF

(71) Applicant: LG ELECTRONICS INC., Seoul (KR)

(72) Inventor: Jonghwan Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/836,473

(22) Filed: Mar. 15, 2013

(65) Prior Publication Data

US 2014/0045433 A1   Feb. 13, 2014

(30) Foreign Application Priority Data

Aug. 10, 2012   (KR) .......................... 10-2012-0087975

(51) Int. Cl.  
*G06Q 10/08*   (2012.01)

(52) U.S. Cl.  
CPC ................................... *G06Q 10/087* (2013.01)

(58) Field of Classification Search  
CPC combination set(s) only.  
See application file for complete search history.

(56) References Cited

U.S. PATENT DOCUMENTS

| 6,204,763 | B1 | 3/2001 | Sone |
| 2004/0016242 | A1 | 1/2004 | Song et al. |
| 2005/0137943 | A1* | 6/2005 | Holzman .......................... 705/28 |
| 2007/0152048 | A1 | 7/2007 | Jung et al. |
| 2012/0101876 | A1* | 4/2012 | Turvey et al. ................. 705/14.1 |
| 2014/0006131 | A1* | 1/2014 | Causey et al. ............... 705/14.24 |

FOREIGN PATENT DOCUMENTS

CN   1470835 A   1/2004

OTHER PUBLICATIONS

"System and Method for a Smart Refrigerator to Create/Modify a Grocery List," IP.com, Journal IP.com Inc. Aug. 1, 2012, Henrietta, New York, 2 pages.

Luo et al., "Smart Fridges with Multimedia Capability for Better Nutrition and Health," Ubiquitous Multimedia Computing on , IEEE, Oct. 13, 2008, Piscataway, New Jersey, 6 pages.

* cited by examiner

*Primary Examiner* — Junpeng Chen  
(74) *Attorney, Agent, or Firm* — Birch, Stewart, Kolasch & Birch, LLP

(57) ABSTRACT

A mobile terminal and method for communicating with a refrigerator, are discussed. According to an embodiment, the mobile terminal includes a communication unit configured to receive an electronic receipt containing purchased article information from a settlement terminal, and to receive storage article information from the refrigerator, the purchased article information identifying at least one purchased article that has been purchased, the storage article information identifying at least one stored article that is stored in the refrigerator; a display unit configured to display the purchased article information and the storage article information; and a controller configured to update the storage article information using the purchased article information based on a user input.

26 Claims, 21 Drawing Sheets

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0087975, filed on Aug. 10, 2012, the contents of which is incorporated by reference herein in its entirety.

BACKGROUND OF THE INVENTION

1. Field of the Invention

The present disclosure relates to a mobile terminal, and more particularly, to a settlement terminal for issuing an electronic receipt, and a mobile terminal in communication with a refrigerator and to a control method for the refrigerator and mobile terminal.

2. Description of the Related Art

Terminals can be classified into mobile/portable terminals and stationary terminals based on their mobility. Furthermore, the mobile terminals can be further classified into handheld terminals and vehicle mount terminals based on whether or not the terminal can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement on the structural or software elements of the terminal may be taken into consideration to support and enhance the functions of the terminal.

As an example of the foregoing improvement, a mobile terminal can receive an electronic receipt through RFID, NFC, or the like. The electronic receipt may be used as a means for proving that a seller has received an amount settled by a consumer during the purchase of articles as well as a useful medium for transferring various information associated with the purchased articles.

SUMMARY OF THE INVENTION

An object of the present disclosure is to provide a mobile terminal for effectively managing storage articles in a refrigerator using an electronic receipt.

Another object of the present invention is to provide a mobile terminal in communication with an appliance such as a refrigerator, which provides improved features and user convenience and which addresses the limitations associated with the related art.

An embodiment of the present invention relates to a mobile terminal in linkage or communication with a settlement terminal and a refrigerator. The mobile terminal may include a communication unit configured to receive an electronic receipt containing purchased article information from the settlement terminal and receive storage article information from the refrigerator; a display unit configured to display the purchased article information and the storage article information; and a controller configured to update the storage article information using the purchased article information.

According to an embodiment, the refrigerator may have a plurality of storage chambers, and the storage article information may include storage location information indicating one of the plurality of storage chambers in which each of a plurality of storage articles stored in the refrigerator is stored.

According to an embodiment, the communication unit may receive the environmental information of the plurality of storage chambers from the refrigerator, and the controller may recommend at least one of the plurality of storage chambers based on the environmental information as a location in which a purchased article selected from the plurality of purchased articles corresponding to the purchased article information is stored.

According to an embodiment, the controller may dispose a plurality of icons corresponding to the plurality of storage articles on a storage chamber image indicating the plurality of storage chambers in a separate manner. The display unit may display the detailed information of a storage article corresponding to the selected at least one icon when at least one of the plurality of icons is selected. The controller may highlight an icon corresponding to the selected at least one storage article to be distinguished from icons corresponding to the remaining storage articles or allow the icons corresponding to the remaining storage articles to be disappeared when at least one of the plurality of storage articles is selected based on reference information determined by the user's input in a state that the plurality of icons are displayed.

According to an embodiment, the controller may determine a hazardous effect on between the first and the second storage article based on the characteristic information of the first and the second storage article, and output alert information according to the hazard effect when the first and second storage article are stored together in one of the plurality of storage chambers.

According to an embodiment, when interested article information set by a family member is received from the refrigerator or another mobile terminal, the controller may compare the purchased article information with the interested article information to determine whether to purchase the family member's interested article, and generate notification information indicating whether to purchase the interested article. Furthermore, when interested article information set by a family member is received from the refrigerator or another mobile terminal, the controller may compare the purchased article information with the interested article information to determine whether the family member's interested article is stored, and generate notification information indicating whether the interested article is stored and the storage location of the interested article.

According to an embodiment, the mobile terminal may further include a memory configured to store recipes for a plurality of foods. When a user's desired food is selected from the plurality of foods, the controller may generate the material article information of the selected food based on a cooking method, and compare the storage article information with material article information to determine whether the material article of the selected food is stored, and generate notification information indicating whether the material article of the selected food is stored. The communication unit may access a server for providing on-line shopping malls in response to acknowledgement information to the notification information, and receive sales information for a material article which is not stored in the refrigerator from the server.

According to an embodiment, the refrigerator may further include a capture unit formed to capture an inner portion of at least one of the plurality of storage chambers of the refrigerator. The display unit may display menu information for controlling the capture unit. The communication unit may transmit a control command to the refrigerator, and receives a captured image of the storage chamber indicated by the control command when the control command is received through the menu information.

According to an embodiment, the communication unit may transmit the updated storage article information to at least either one of the refrigerator and another mobile terminal.

An embodiment of the present disclosure relates to a method of controlling a mobile terminal in communication with a settlement terminal and a refrigerator. The control method may include receiving an electronic receipt containing purchased article information from the settlement terminal; receiving storage article information from the refrigerator; displaying the purchased article information and the storage article information; and updating the storage article information using the purchased article information.

According to an embodiment, the refrigerator have a plurality of storage chambers, and the displaying the purchased article information and the storage article information may display storage location information indicating one of the plurality of storage chambers in which each of a plurality of storage articles stored in the refrigerator is stored.

According to an embodiment, the control method may further include receiving the environmental information of the plurality of storage chambers from the refrigerator; and recommending at least one of the plurality of storage chambers based on the environmental information as a location in which a purchased article selected from the plurality of purchased articles corresponding to the purchased article information is stored.

According to an embodiment, the displaying the purchased article information and the storage article information may dispose a plurality of icons corresponding to the plurality of storage articles on a storage chamber image indicating the plurality of storage chambers in a separate manner. Furthermore, the displaying the purchased article information and the storage article information may display the detailed information of a storage article corresponding to the selected at least one icon when at least one of the plurality of icons is selected. Furthermore, the displaying the purchased article information and the storage article information may highlight an icon corresponding to the selected at least one storage article to be distinguished from icons corresponding to the remaining storage articles or allow the icons corresponding to the remaining storage articles to be disappeared when at least one of the plurality of storage articles is selected based on reference information determined by the user's input in a state that the plurality of icons are displayed.

According to an embodiment, the control method may further include determining a hazardous effect on between the first and the second storage articles based on the characteristic information of the first and the second storage articles when the first and second storage articles are stored together in one of the plurality of storage chambers; and outputting alert information according to the hazard effect.

According to an embodiment, the control method may further include receiving interested article information set by a family member from the refrigerator or another mobile terminal; comparing the purchased article information with the interested article information to determine whether to purchase the family member's interested article; and generating notification information indicating whether to purchase the interested article.

According to an embodiment, the control method may further include receiving interested article information set by a family member from the refrigerator or another mobile terminal; comparing the purchased article information with the interested article information to determine whether the family member's interested article is stored; and generating notification information indicating whether the interested article is stored and the storage location of the interested article.

According to an embodiment, the control method may further include generating the material article information of the selected food based on cooking methods for a plurality of foods when a user's desired food is selected from the plurality of foods; comparing the storage article information with material article information to determine whether the material article of the selected food is stored; and generating notification information indicating the non-stored material article of the selected food. Furthermore, the control method may further include accessing a server for providing on-line shopping malls in response to a purchase command for the non-stored material article; and receiving sales information for the non-stored material article from the server.

According to an embodiment, the control method may further include displaying menu information for controlling a capture unit provided in the refrigerator, and formed to capture an inner portion of at least one of the plurality of storage chambers; transmitting the control command to the refrigerator when the control command is received through the menu information; and receiving a captured image of the storage chamber indicated by the control command.

According to an embodiment, the control method may further include transmitting the updated storage article information to at least either one of the refrigerator and another mobile terminal.

According to an embodiment, a mobile terminal for communicating with a refrigerator, includes a communication unit configured to receive an electronic receipt containing purchased article information from a settlement terminal, and to receive storage article information from the refrigerator, the purchased article information identifying at least one purchased article that has been purchased, the storage article information identifying at least one stored article that is stored in the refrigerator; a display unit configured to display the purchased article information and the storage article information; and a controller configured to update the storage article information using the purchased article information based on a user input.

According to an embodiment, there is provided a method for communicating with a refrigerator using a mobile terminal, the mobile terminal including a communication unit, a display unit and a controller, the method including receiving, by the communication unit, an electronic receipt containing purchased article information from a settlement terminal, the purchased article information identifying at least one purchased article that has been purchased; receiving storage article information from the refrigerator, the storage article information identifying at least one stored article that is stored in the refrigerator; displaying, on the display unit, the purchased article information and the storage article information; and updating, by the controller, the storage article information using the purchased article information based on a user input.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
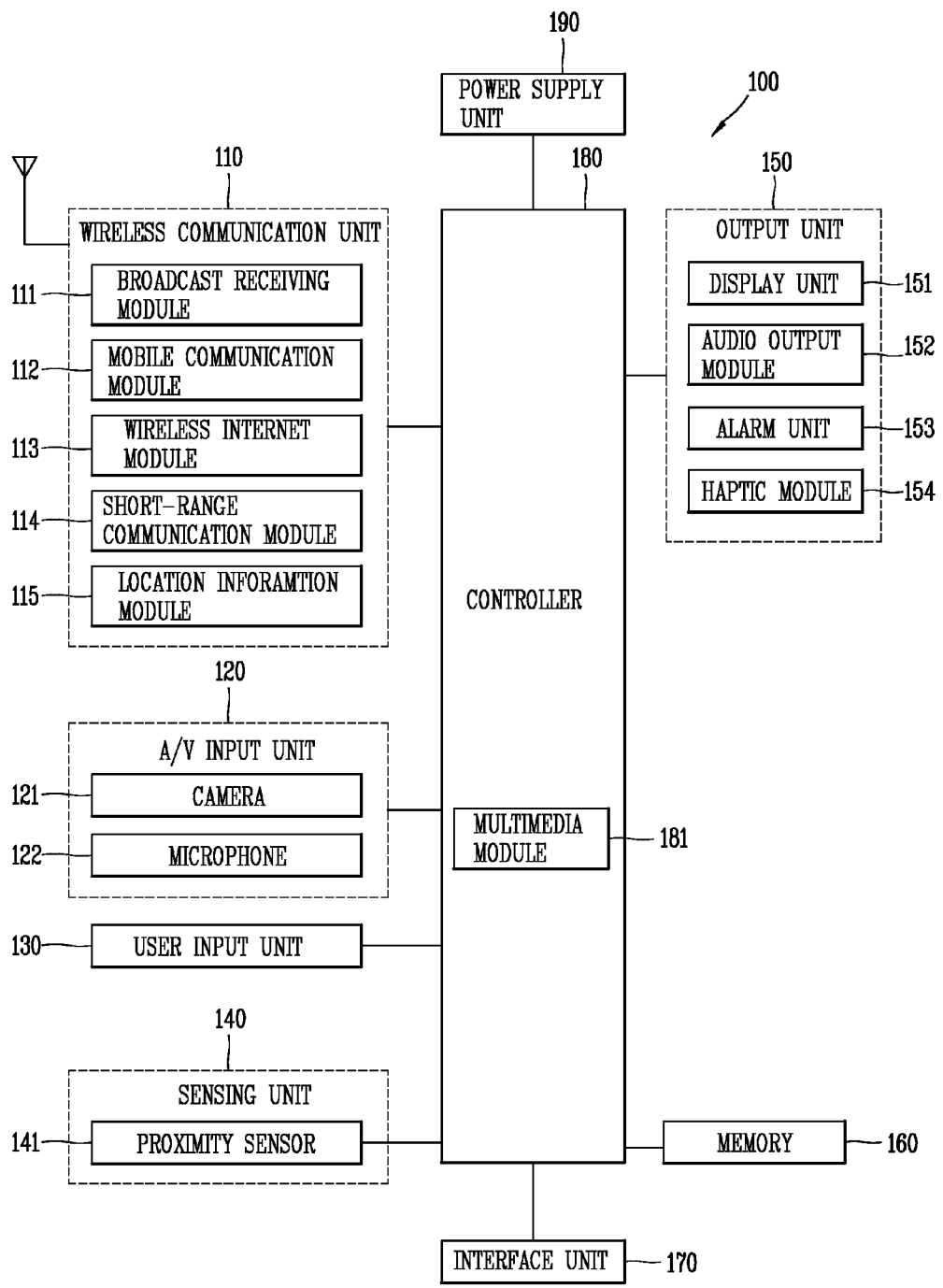
FIG. 1 is a block diagram illustrating a mobile terminal associated with the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the embodiments of the present invention, some parts not related to the description are omitted, and like reference numerals designate like constituent elements throughout the specification.

A mobile device or mobile terminal disclosed herein may include a portable phone, a smart phone, a laptop computer, a digital broadcast mobile device, a personal digital assistant (PDA), a portable multimedia player (PMP), a navigation, a tablet, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. All components of the mobile terminal 100 are operatively coupled and configured. However, all the constituent elements as illustrated in FIG. 1 may not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a global positioning system (GPS) module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170.

The sensing unit 140 may include a proximity sensor 141. Furthermore, the sensing unit 140 may include a touch sensor for sensing a touch operation to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred to as a "touch screen".

When there is a touch input through the touch screen, the corresponding signals are sent to a touch controller of the mobile terminal. The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized into a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal 100 with external device(s) connected to or in communication with the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad which can be a hard keypad or a virtual keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 and the touch pad are touched together within a predetermined period of time, one function of the mobile terminal 100 may be executed. As a case of being touched together, there is a case when the user clamps a terminal body of the mobile terminal 100 using the thumb and forefinger. For one of the functions executed in the mobile terminal 100, there may be an activation or de-activation for the display unit 151 or the touch pad.

Figure 2A:
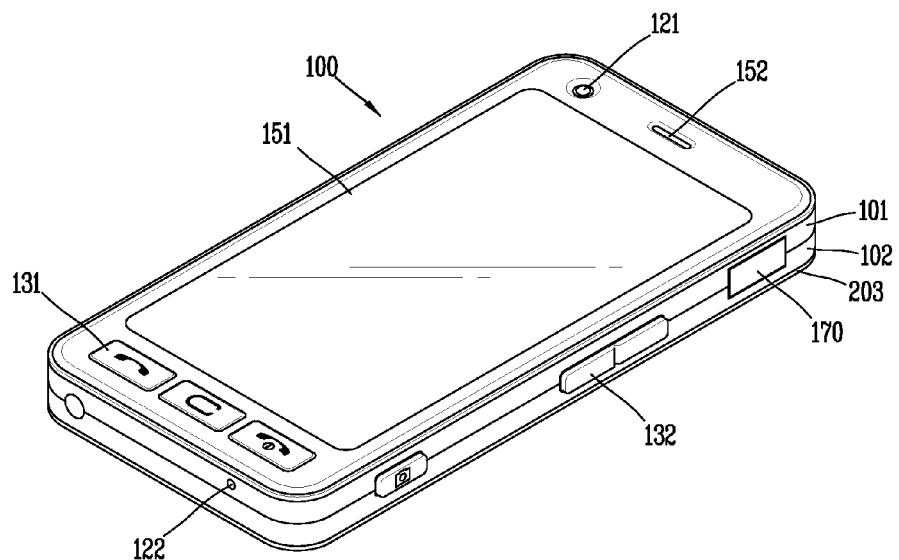
FIGS. 2A and 2B are perspective views illustrating an external appearance of a mobile terminal associated with the present disclosure.
Figure 2B:
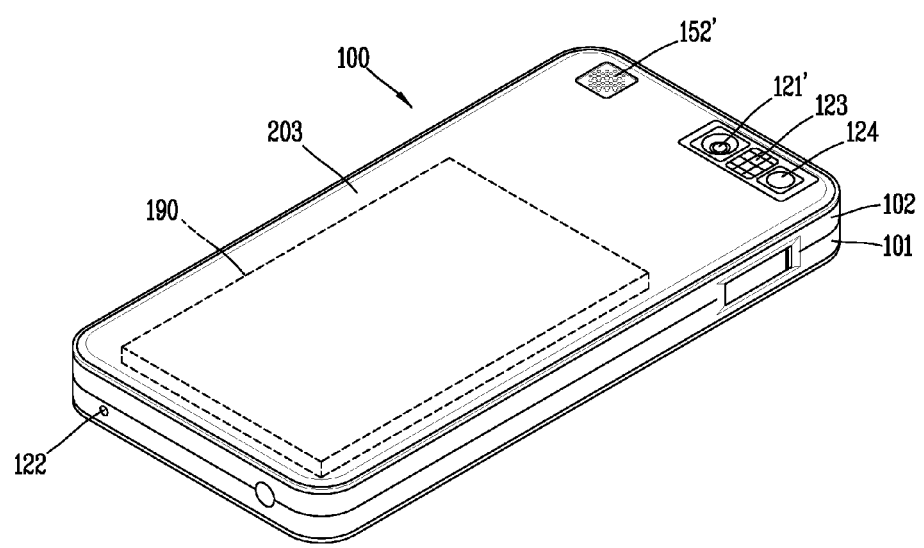

FIGS. 2A and 2B are perspective views illustrating an example of the external appearance of the mobile terminal 100 associated with the present invention. FIG. 2A illustrates a front surface and one lateral surface of the mobile terminal 100, and FIG. 2B illustrates a rear surface and the other lateral surface of the mobile terminal 100. The mobile terminal 100 can, however, have any other appearance.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151. The user input unit 130 including first and second manipulating units 131, 132 and the microphone 122 are disposed on a region adjacent to the other end thereof. The manipulating unit 132 and the interface 170, and the like, may be disposed on a lateral surface of the front case 101 and the rear case 102.

The user input unit 130 which may include a plurality of the manipulating units 131, 132 is manipulated to receive a command for controlling the operation of the portable terminal 100.

The first or a second manipulating unit 131, 132 may receive various commands. The first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface 203 of the terminal body, namely, the rear case 102. The camera 121' has an image capturing direction, which is substantially opposite to the direction of the camera 121 (refer to FIG. 2A), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately.

Meanwhile, the cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna for receiving broadcast signals may be additionally disposed on a lateral surface of the terminal body. The antenna constituting the broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad for detecting a touch may be additionally mounted on the rear case 102. The touch pad may be also configured with an optical transmission type, similarly to the display unit 151 (refer to FIG. 2A). Alternatively, a rear display unit for displaying visual information may be additionally mounted on the touch pad. At this time, information displayed on the both surfaces of the front display unit 151 and rear display unit may be controlled by the touch pad.

The touch pad may be operated in conjunction with the display unit 151 of the front case 101. The touch pad may be disposed in parallel at a rear side of the display unit 151. The touch pad may have the same size as or a smaller size than the display unit 151.

Figure 3:
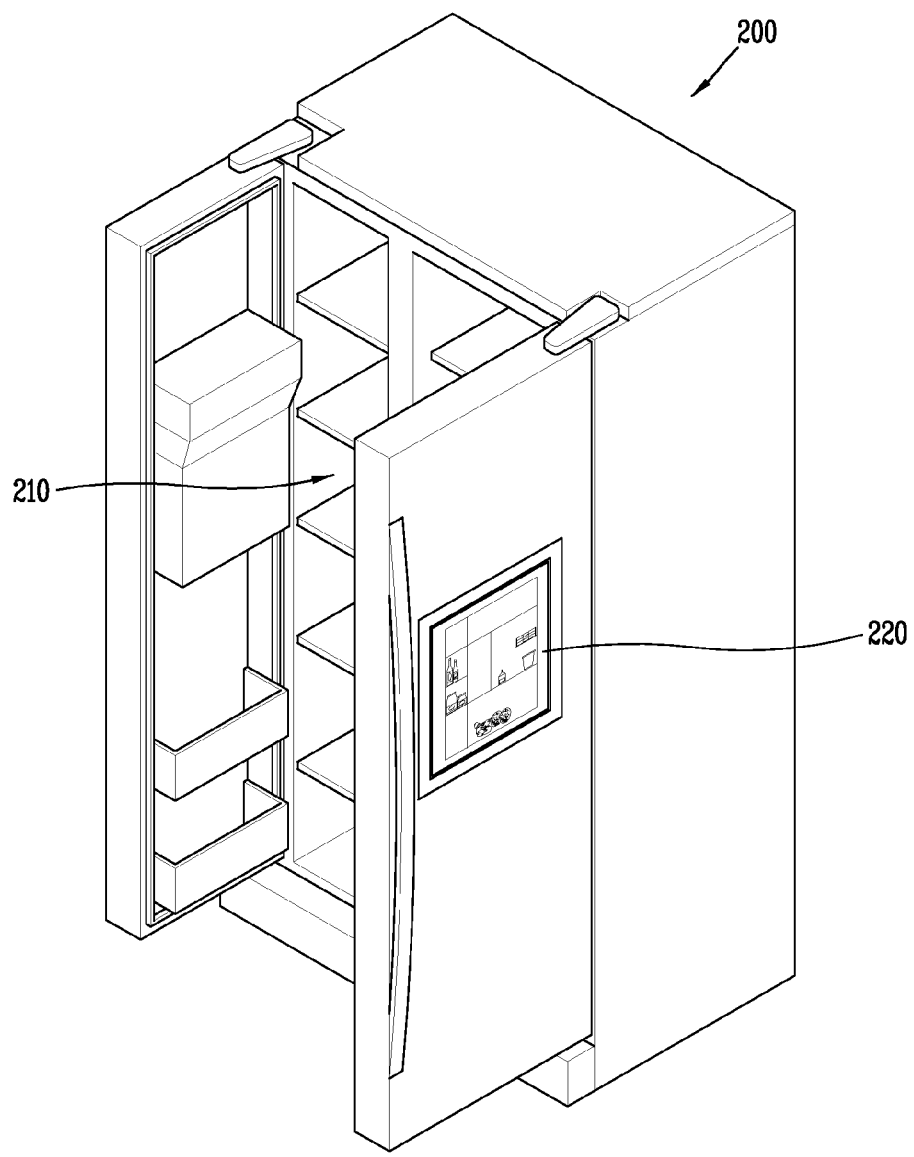
FIG. 3 is a perspective view illustrating an external appearance of a refrigerator associated with the present disclosure.

FIG. 3 is a perspective view illustrating an example of an external appearance of a refrigerator 200 associated with the present disclosure. Referring to FIG. 3, the refrigerator 200 may include a plurality of storage chambers 210 and a display unit 220. The storage chambers 210 may be divided into a freezing chamber and a refrigerating chamber, and cam be located at a refrigerator body and a door. The display unit 220 may be implemented by a touch screen. Furthermore, the display unit 220 may display information according to the user's input and information received from the mobile terminal 100 (refer to FIG. 1).

Furthermore, the refrigerator 200 according to the present disclosure may include a sensing unit for sensing status information such as temperature, humidity and the like within the storage chambers 210, a capture unit for capturing an inner portion of at least one storage chamber, an illumination unit for illuminating an inner portion of the storage chambers, a communication unit configured to communicate with an external device such as the mobile terminal 100, a memory for storing various data including information on the articles/items stored in the chambers, and a controller for controlling the entire operation of the refrigerator 200, and the like.

The capture unit may include at least one camera module mounted in at least one inner portion of at least one of the storage chambers, and captures images of the inner portion(s) of the storage chamber(s). The illumination unit may be driven when opening or closing the door of the refrigerator or capturing an inner portion of the storage chamber to illuminate an inner portion of the storage chamber. The communication unit may be connected to the mobile terminal 100 in a wired or wireless manner to perform data transmission and reception. The refrigerator 200 is fully capable of communicating with the mobile terminal 100 and/or another device/server to exchange data According to the present specification, the refrigerator is taken as an example for an electronic device in communication with the mobile terminal 100, but the embodiments of the present disclosure are not be limited to this, and may be also applicable to various electronic devices having the function of receiving, storing and managing articles sold in the market. For example, the embodiments of the present disclosure may be also applicable to a styler for receiving and managing clothes.

Figure 4:
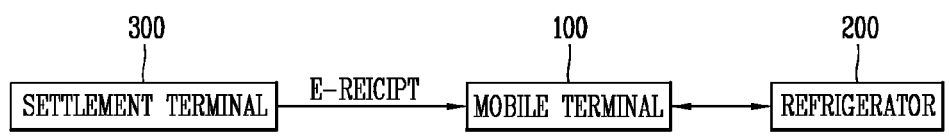
FIG. 4 is a block diagram illustrating an article management system according to an embodiment of the present disclosure.

FIG. 4 is a block diagram illustrating an article management system according to an embodiment of the present disclosure. Referring to FIG. 4, the article management system may include the mobile terminal 100, the refrigerator 200 (or other appliance or electronic device), and a settlement terminal 300. All the components of the system are operatively coupled and configured.

The mobile terminal 100 may be linked with or in communication with the refrigerator 200 and settlement terminal 300 to manage storage articles in the refrigerator 200. The settlement terminal 300 can be a server or other entity that can transmit electronic receipts of purchased articles/items for a user to the mobile terminal 100 and/or the refrigerator 200. For instance, the settlement terminal 300 can be a server or entity managed at a shopping store or grocery store where the user purchases articles. Automatically or upon request by the mobile terminal 100, the settlement terminal 300 can transmit an electronic receipt of the articles purchased by the user to the mobile terminal 100.

More specifically, the mobile terminal 100 may receive an electronic receipt from the settlement terminal 300, and generate and update various information (hereinafter referred to as "storage article information") for storage articles in the refrigerator 200 using the electronic receipt. The mobile terminal 100 and refrigerator 200 may share the updated storage article information so that each device mains the updated storage article information. The storage article information or the updated storage article information can identify at least one article that is currently stored in the refrigerator 200.

Here, an electronic receipt may include various information (hereinafter referred to as "purchased article information") for articles/items purchased by the user at stores or other locations. The purchased article information may include the article name, article category, article storage condition (for example, recommended storage period, storage temperature, storage humidity, antimicrobial treatment need, etc.), purchase quantity, unit capacity, purchase place/location, purchase time, purchase price, settlement means (e.g., via cash or credit card), and the like for each of the purchased articles.

Hereinafter, examples of the operations and methods of the mobile terminal 100 for managing storage articles in the refrigerator 200 will be described in detail. These operations and methods can be implemented in the system of FIG. 4 or in other suitable systems/devices. Further, the operations and methods can be part of an article management application of the present invention.

Figure 5:
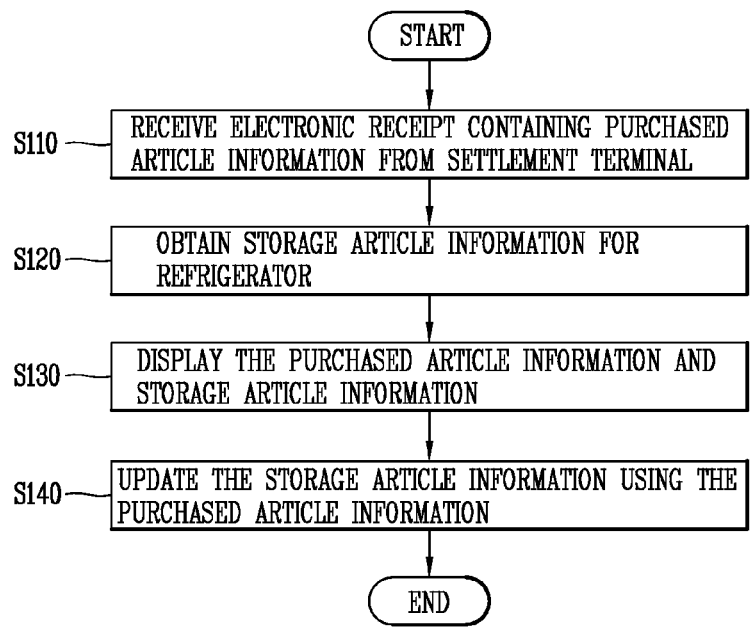
FIG. 5 is a flow chart for explaining a method of controlling a mobile terminal according to an embodiment of the present disclosure.

FIG. 5 is a flow chart for explaining a method of controlling the mobile terminal 100 according to an embodiment of the present disclosure. Referring to FIG. 5, the process (S110) of receiving an electronic receipt containing purchased article information from the settlement terminal 300 is carried out. Furthermore, the process (S120) of receiving storage article information from the refrigerator is carried out.

Here the refrigerator 200 may store the storage article information. The refrigerator 200 may store information on articles that are currently stored in the refrigerator 200, which can be part of the storage article information, by updating the storage article information at a preset time point based on initial storage article information.

The initial storage article information may be entered by the user at the initial stage of storing the articles in the refrigerator 200. For instance, the mobile terminal 100 may receive initial storage article information from the user. Then, the mobile terminal 100 may transmit the received initial storage article information to the refrigerator 200. Accordingly, the refrigerator 200 may store the initial storage article information which can identify articles initially stored in the refrigerator 200 at some reference time point.

Meanwhile, the user may apply a touch input to the display unit 220 or input a voice signal to the microphone of the refrigerator 200, thereby directly inputting the initial storage article information to the refrigerator 200 for storage therein. For instance, when the user places the articles into the refrigerator 200, the user can enter the article information on the articles being stored in the refrigerator 200 using the display unit 200 and/or voice so that refrigerator 200 has the initial storage article information, which then can be sent to the mobile terminal 100. As a variation, when the user places the articles into the refrigerator, the user can enter the article information directly to the mobile terminal 100, which can be sent to the refrigerator 200. Any updates to the initial storage article information can be shared between the refrigerator 200 and the mobile terminal 100.

Furthermore, the initial storage article information may be acquired based on an electronic receipt initially received. Specifically, the mobile terminal 100 may receive an electronic receipt including the initial storage article information from the settlement terminal 300. The mobile terminal 100 may generate initial storage article information based on information on some purchased articles that can be stored in the refrigerator 200 among the purchased articles identified on the electronic receipt. For instance, based on the purchased article information from the electronic receipt, the mobile terminal 100 may judge which articles will likely be stored in the refrigerator 200 and generates the initial storage article information based on this judgment, assuming that such articles will be stored in the refrigerator 200. Then, the mobile terminal 100 may transmit the generated initial storage article information to the refrigerator 200. Accordingly, the refrigerator 200 may store the initial storage article information.

In another example, the initial storage article information may be acquired by one or more cameras provided within the refrigerator 200. For instance, the camera(s) provided within the refrigerator 200 may capture image(s) of articles initially stored in the refrigerator 200. Then, the mobile terminal 100 may receive the captured image(s) or image information from the refrigerator 200, and identify articles stored in the refrigerator by analyzing the captured image(s), thereby generating the initial storage article information. The mobile terminal 100 may transmit the generated initial storage article information to the refrigerator 200.

In still another example, the refrigerator 200 may generate the initial storage article information by directly recognizing articles contained in the captured image(s) obtained by the camera(s) located within the refrigerator 200. In this case, the refrigerator 200 may transmit the storage article information to the refrigerator 200.

As described above, the refrigerator 200 may store initial storage article information. The refrigerator 200 may then update or generate storage article information at a preset time point based on the initial storage article information. Hereinafter, as an example of updating the storage article information, an embodiment of deleting at least part of the storage article information will be described.

In one example, the user may directly update the storage article information using the mobile terminal 100. For instance, the mobile terminal 100 may update the (initial) storage article information by deleting an item corresponding to a storage article from the storage article list based on the user's input. If the user knows that a certain article has been removed from the refrigerator, then the user can delete this article from the storage article information stored in the mobile terminal 100 via the menus displayed on the terminal 100, thereby generating the updated storage article information. The mobile terminal 100 may transmit the updated storage article information to the refrigerator 200.

In another example, the user may update the storage article information by applying a touch input to the display unit 220 or inputting a voice signal to the microphone of the refrigerator 200. In this case, the refrigerator 200 may transmit the updated storage article information to the mobile terminal 100.

In still another example, the storage article information may be updated by using an electronic receipt. Specifically, when a predetermined period of time has passed in view of expiration date information or storage period information of any article identified on the electronic receipt, the mobile terminal 100 may update the storage article information by deleting any such article corresponding to the expiration date information or storage period information from the storage article information stored in the mobile terminal 100. The mobile terminal 100 may then transmit the updated storage article information to the refrigerator 200. For example, the mobile terminal 100 may display a notification message on the display unit 151 at a preset first time point (for example, three days before the expiration date) based on the expiration date information contained in the electronic receipt. Then, the mobile terminal 100 may delete information on articles corresponding to a preset second time point (for example, on the next day of the expiration date).

Furthermore, the storage article information may be updated by a camera provided within the refrigerator 200. Specifically, the camera provided within the refrigerator 200 may capture an image for articles currently stored in the refrigerator at preset intervals. The mobile terminal 100 may receive the captured image from the refrigerator 200, and identify articles contained in the received image, thereby updating storage article information at preset intervals. The mobile terminal 100 may transmit the updated storage article information to the refrigerator 200.

On the other hand, the refrigerator 200 may update the storage article information at preset intervals by directly recognizing articles contained in the captured image. In this case, the refrigerator 200 may transmit the updated storage article information to the refrigerator 200.

As described above, the updated storage article information can be stored in each of the refrigerator 200 and mobile terminal 100, respectively, through a synchronization process between the refrigerator 200 and the mobile terminal 100.

Next, the process (S130) of displaying the purchased article information and storage article information is carried out. Such information can be displayed on the mobile terminal 100 and/or the refrigerator 200. Here, information on some purchased articles that can be stored in the refrigerator 200 among purchased articles corresponding to the electronic receipt may be displayed. In other words, purchased articles which are determined not to be stored or determined to have no need to be stored in the refrigerator 200 may be ignored, and only information on the remaining purchased articles (which will likely be or should be stored in the refrigerator 200) may be recognized as valid information for generating the storage article information. At this time, whether to store each purchased article in the refrigerator 200 may be automatically determined according to a predetermined condition or manually determined according to the user's input.

Subsequently, the process (S140) of updating the storage article information using the purchased article information is carried out. For example, a purchased article list may be added to a storage article list. Furthermore, an item corresponding to the storage article may be deleted from the storage article list or the storage location information for the storage article may be modified according to the user's input.

The storage article information updated by the mobile terminal 100 or using any method described above may be transmitted to the refrigerator 200 or to the mobile terminal 100. Furthermore, when a request signal is received from another mobile terminal (for example, a mobile terminal used by a family member), the updated storage article information may be transmitted to the mobile terminal that has sent the request signal.

As described above, according to the mobile terminal 100 in accordance with the present disclosure, the purchased article information based on an electronic receipt may be used to update the storage article information of the refrigerator 200, thereby enhancing user convenience in managing the storage articles of the refrigerator 200. Here, storage articles can include articles that are currently stored and/or to be stored in the refrigerator 200. For example, when the user purchases articles which will likely be stored in the refrigerator 200, it may be possible to reduce a burden of manually inputting storage article information for managing the storage articles since the storage article information may be generated automatically based on the purchased article information. And depending on the actually stored articles' information, the user can modify the generated storage article information so that more accurate and current storage article information may be available.

Figure 6A:
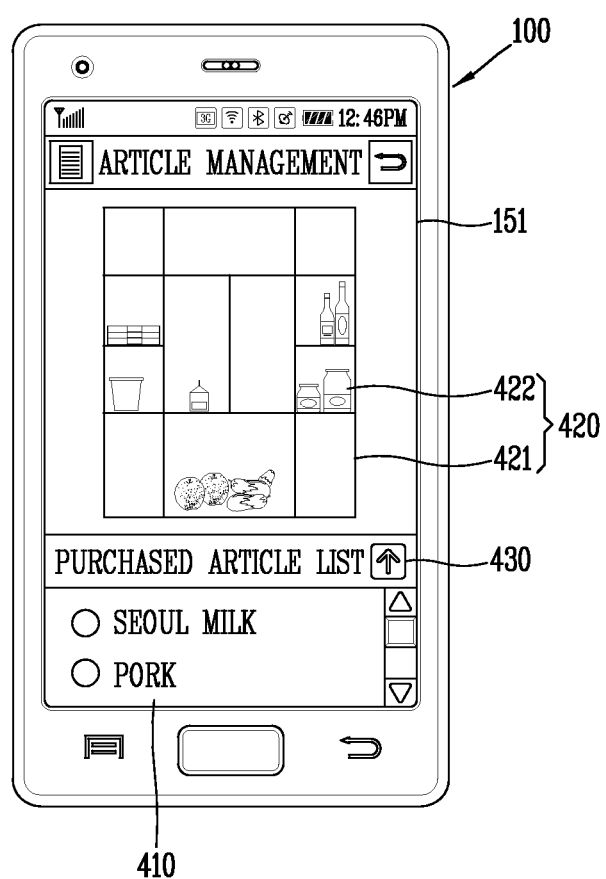
FIGS. 6A and 6B are conceptual views illustrating examples of a user interface of a mobile terminal for article management according to an embodiment of the present disclosure.
Figure 6B:
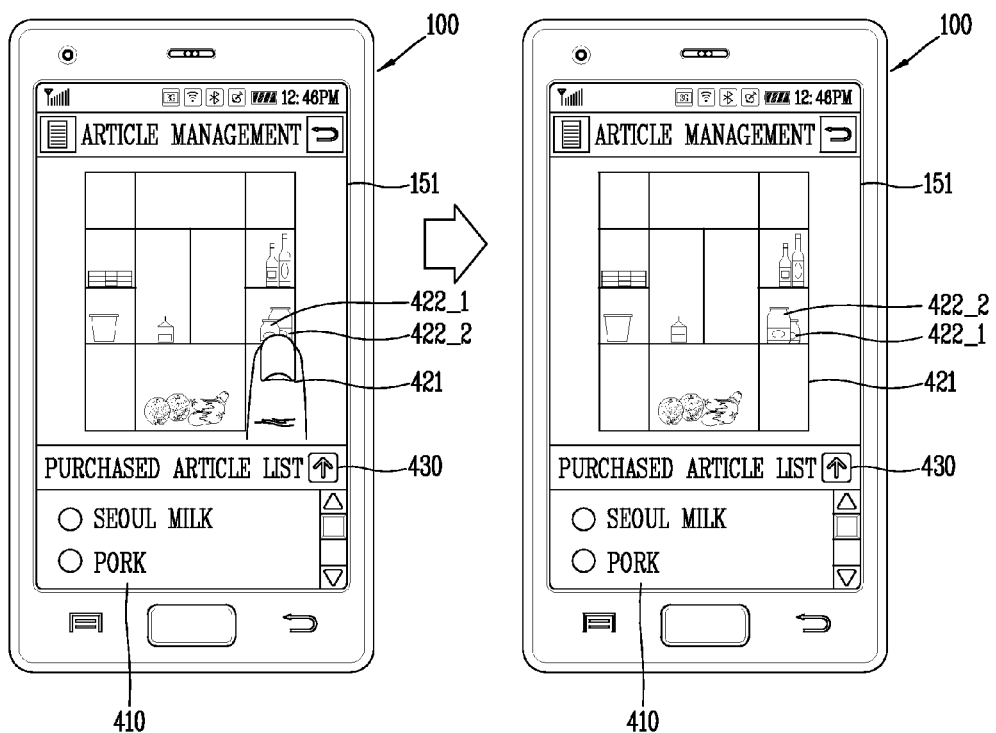

FIGS. 6A and 6B are conceptual views illustrating an example of a user interface of the mobile terminal 100 for article management according to an embodiment of the present disclosure. The controller 180 may execute an application (hereinafter referred to as an "article management application") for managing the storage articles of the refrigerator 200. During the execution of the article management application, the controller 180 may control the display unit 151 to display a screen image containing purchased article information, storage article information, and various control menus, and the like.

Referring to FIG. 6A, the controller 180 may detect purchased article information from an electronic receipt received from the settlement terminal 300 to generate a purchased article list 410, and control the display unit 151 to display them. When an item/article from the displayed purchased article list 410 is selected by a user, the controller 180 may control the display unit 151 to display the detailed information of a purchased article corresponding to the selected item. The detailed information of a selected purchased article may be obtained based on the electronic receipt or provided by an external server.

The controller 180 may detect storage location information 420 from the storage article information (which may be received from the refrigerator 200). The controller 180 may control the display unit 151 to display the storage location information 420 along with the purchased article list 410 on the screen. Here, the storage location information 420 refers to information indicating one of the plurality of storage chambers 210 in which each of a plurality of storage articles stored in the refrigerator 200 is stored. The storage location information 420 notifies the user a location within the refrigerator at which an article is stored. More specifically, the storage location information 420 may include a storage chamber image 421, one or more icons 422 each corresponding to a storage article of the refrigerator 200 (e.g., article currently stored in the refrigerator 200), and the like. The storage chamber image 421 may indicate the storage chambers of the refrigerator 200 in a separate manner, and the icon 422 may be disposed at a divided region of the storage chamber image 421. It may be possible to find one of the plurality of storage chambers in which the relevant storage article is stored.

As an example of the control menu contained in the screen image which can be displayed on the mobile terminal 100, a menu button 430 for updating the storage article information may be provided. When a touch input to the menu button 430 is sensed, the controller 180 can automatically update the storage article information using the purchased article information and the updated storage article information is displayed on the mobile terminal 100. A method of updating the storage article information according to an embodiment of the invention will be described later in detail with reference to FIGS. 7A and 7B.

Referring to FIG. 6B, a plurality of icons 422_1, 422_2 may be displayed in an overlapped manner with each other. The icon overlap may indicate a relative arrangement relationship between the storage articles corresponding to the icons 422_1, 422_2. For example, when the first icon 422_1 is overlapped with the second icon 422_2 to hide at least a part of the second icon 422_2, it denotes that a storage article corresponding to the second icon 422_2 is placed more at an inner side of the storage chamber than a storage article corresponding to the first icon 422_1. According to the present specification, in such cases, it is expressed that the first icon 422_1 is placed on the second icon 422_2, and the second icon 422_2 is placed under the first icon 422_1.

Furthermore, the icon overlap may be changed based on a touch input. For example, a relative overlapped location between the displayed first and the second icons 422_1, 422_2 may be changed according to a long-touch gesture by the user. More specifically, when a long-touch gesture or touch for a region in which the icons 422_1, 422_2 are overlapped with each other is sensed, the first and the second icons 422_1, 422_2 may be controlled in such a manner that the second icon 422_2 that has been placed under the first icon 422_1 is now placed on the first icon 422_1, or the first icon 422_1 that has been placed on the second icon 422_2 is now placed under the second icon 422_2.

Figure 7A:
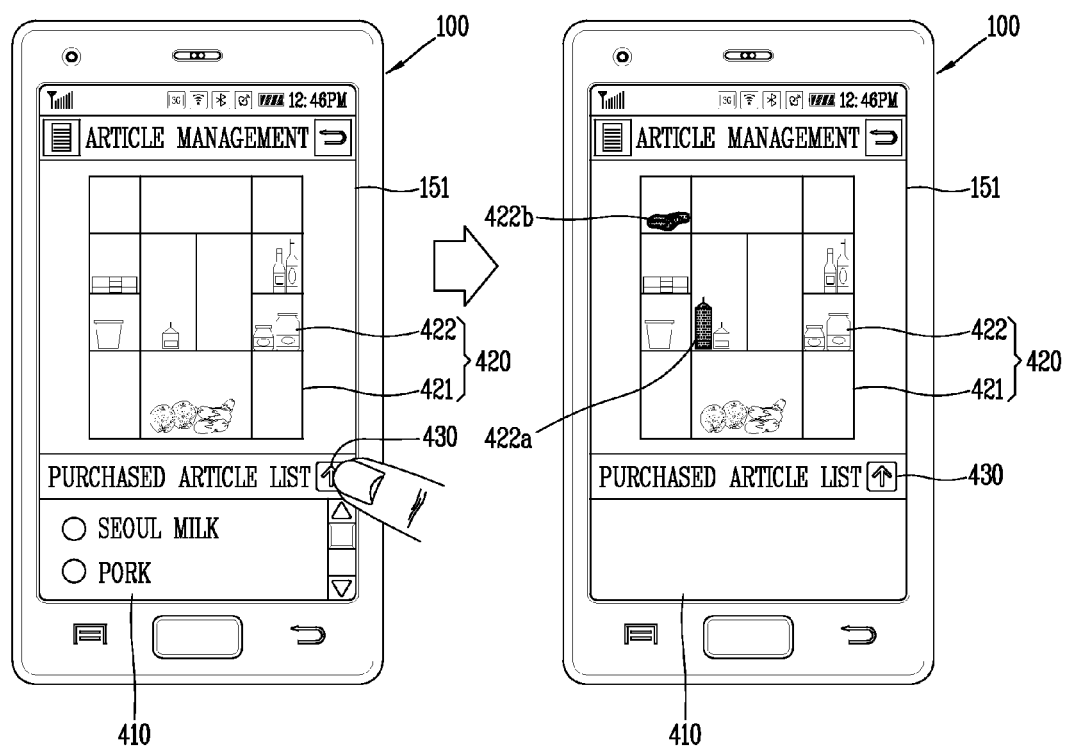
FIGS. 7A and 7B are conceptual views illustrating examples of a user interface of a mobile terminal associated with updating storage article information according to an embodiment of the present disclosure.
Figure 7B:
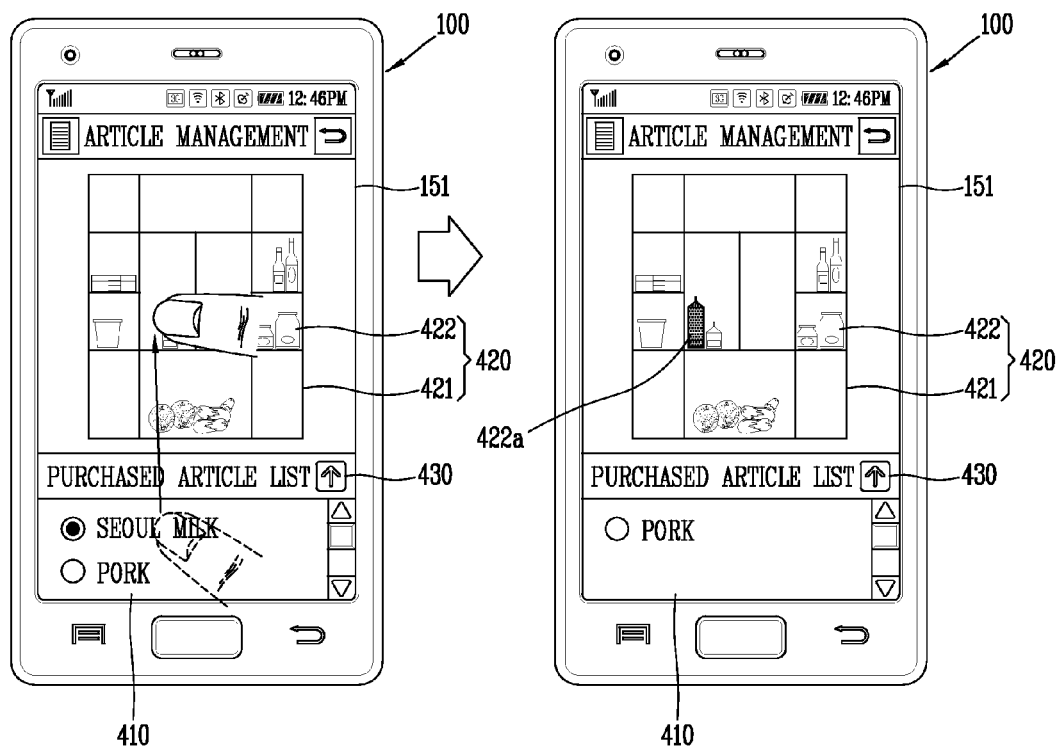

FIGS. 7A and 7B are conceptual views illustrating an example of a user interface of the mobile terminal 100 associated with updating storage article information according to an embodiment of the present disclosure. FIG. 7A illustrates an operation example of the mobile terminal 100 associated with the automatic update of the storage article information. Furthermore, FIG. 7B illustrates an operation example of the mobile terminal 100 associated with the manual update of the storage article information.

Referring to FIG. 7A, the controller 180 may add the purchased article information to the storage article information in response to a touch input to the menu button 430. Furthermore, the controller 180 may determine a refrigerator's storage chamber suitable to the storage condition of a purchased article, and reflect it on the storage article information.

For example, a user can touch the menu button 430 to automatically update the displayed storage article information in view of the purchased article list 410. Further when the storage article information is updated, the controller 180 may generate icons 422a, 422b respectively corresponding to purchased articles from the displayed purchased article list 410 (e.g., "Seoul Milk" and "Pork"), to now display them on the storage chamber image 421 which now displays the updated storage article information. Furthermore, the controller 180 may delete items corresponding to those purchased articles, respectively, from the purchased article list 410.

Referring to FIG. 7B, the controller 180 may add information on a purchased article (hereinafter referred to as a "selected purchased article") corresponding to an item selected from the purchased article list 410 to the storage article information in response to a drag gesture input or other user input. More specifically, when an item (e.g., "Seoul Milk") selected by the drag gesture input is moved to a specific region of the storage chamber image 421, the controller 180 may add the detailed information of the selected purchased article to the storage article information.

For example, when the storage article information is updated, the controller 180 may generate an icon 422a (e.g., an image of milk carton) corresponding to the selected purchased article to place it in a specific region of the storage chamber image 421. At this time, the controller 180 may delete the moved item from the purchased article list 410 so that the purchased article list is updated. If needed, the user can also move around the article icons within the chambers of the storage chamber image 421, and can also move the article icons from the storage chamber image 421 to the purchased article list 410.

Figure 8:
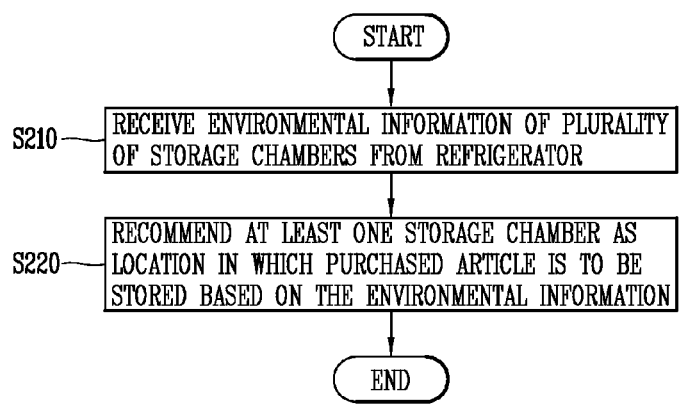
FIG. 8 is a flow chart for explaining a method of controlling a mobile terminal according to an embodiment of the present disclosure.

FIG. 8 is a flow chart for explaining a method of controlling the mobile terminal 100 according to an embodiment of the present disclosure. Referring to FIG. 8, the process (S210) of receiving environmental information of the plurality of storage chambers 210 from the refrigerator 200 is carried out. The environmental information may be acquired by a sensing unit (for example, temperature sensor, humidity sensor, etc.) of the refrigerator 200, and may include temperature, humidity, antimicrobial function, and the like. The environment information provides information on the environment inside the refrigerator, such as the temperature(s) inside the storage chambers of the refrigerator, etc. Next, the process (S220) of recommending at least one of the plurality of storage chambers 210 as a location in which the purchased article is to be stored (or can be stored) based on the environmental information is carried out. In other words, a storage chamber providing a storage environment suitable to the storage condition of at least one purchased article among the plurality of storage chambers of the refrigerator may be recommended by the mobile terminal 100 based on the environment information.

Figure 9:
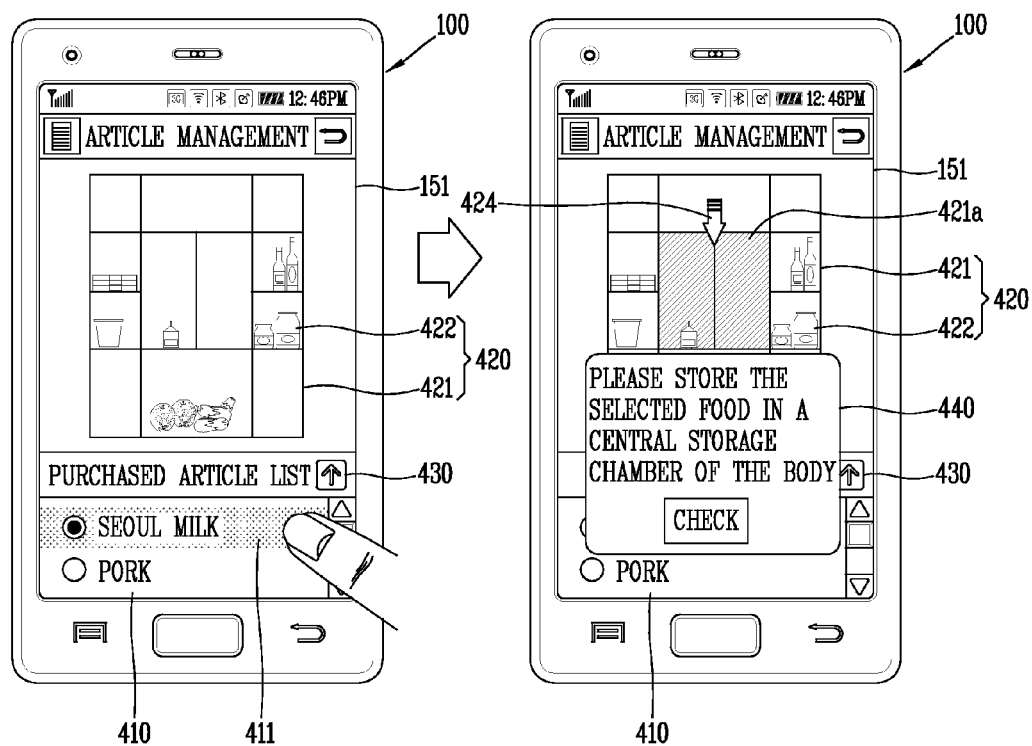
FIG. 9 is an exemplary conceptual view illustrating the operation of a mobile terminal according to the control method of FIG. 8.

FIG. 9 is an exemplary conceptual view illustrating an example of the operation of the mobile terminal 100 according to the control method of FIG. 8. Referring to FIG. 9, when an item 411 (e.g., "Seoul Milk") from the purchased article list is selected based on a touch input, the controller 180 may recommend a storage chamber suitable to store a purchased article (the selected purchased article) corresponding to the selected item 411. For example, when a long-touch gesture input is sensed to the item 411, the controller 180 may compare and analyze the storage condition of the selected purchased article ("Seoul Milk") and the environmental information received from the refrigerator 200 to recommend at least one of the plurality of storage chambers in the refrigerator for storing the selected purchased article.

In this regard, the controller 180 may output guide information for indicating the recommended storage chamber for the selected purchased article. For example, as illustrated on the right side of FIG. 9, a guide message 440 such as "Please store the selected food in a central storage chamber of the body" may be displayed through a popup window so as to inform the user an area within the refrigerator in which the selected food item is recommended for storage.

Furthermore, the controller 180 may control the display unit 151 such that a region 421a corresponding to the recommended storage chamber among divided regions of the storage chamber image 421 is displayed in a separate or distinguishable manner from the other regions. For example, at least one of the brightness, color, shape, three-dimensional depth value, and the like of the region 421a corresponding to the recommended storage chamber may be changed, or a graphic effect such as highlight, blink and the like may be provided to the relevant region 421a so that the user can visually and easily recognize the recommended storage area.

Furthermore, the controller 180 may control the display unit 151 to display an indicator 424 for guiding the user to the region 421a corresponding to the recommended storage chamber. For example, the region 421a corresponding to the recommended storage chamber may be guided through an arrow image 424 as illustrated in the drawing. Thus by using the recommendations provided on the display unit 151, the user can store a purchased article in an optimal storage location within the refrigerator 100 and once the article is stored in the recommended location, the article storage information as stored and displayed can then be updated to reflect such storing.

Figure 10:
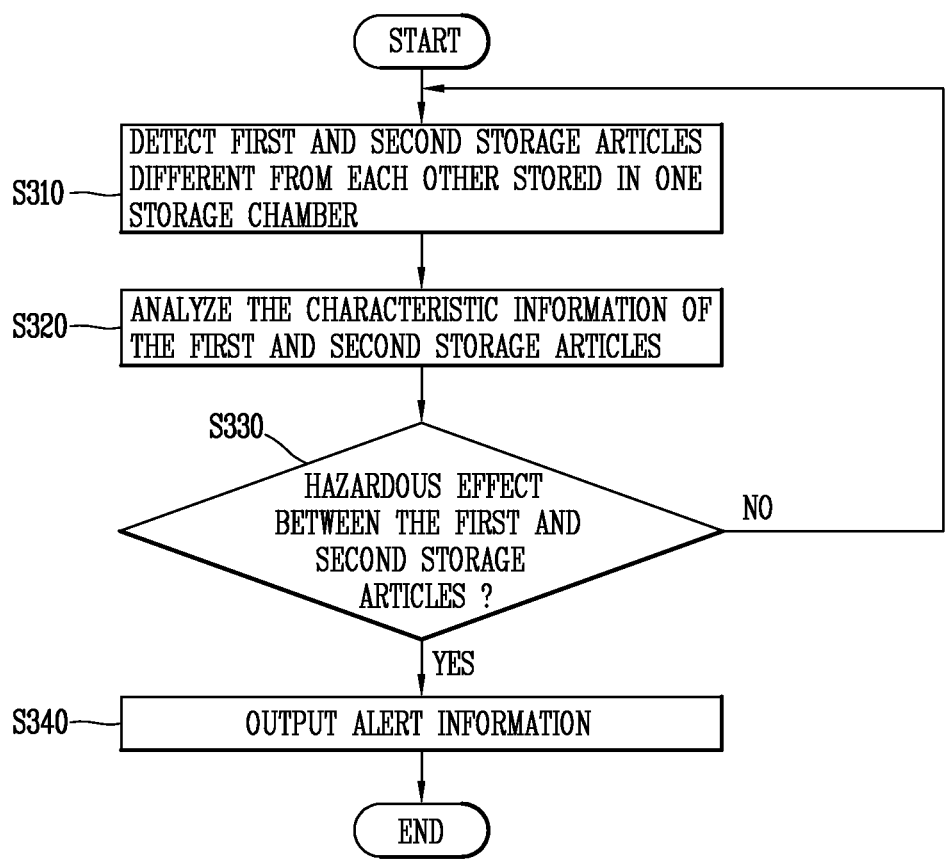
FIG. 10 is a flow chart for explaining a method of controlling a mobile terminal according to an embodiment of the present disclosure.

FIG. 10 is a flow chart for explaining a method of controlling the mobile terminal 100 according to an embodiment of the present disclosure. Referring to FIG. 10, the process (S310) of detecting a first and a second storage article, which are different from each other but stored in one storage chamber of the refrigerator 200 based on the storage article information, is carried out. Here, storage articles different from each other may denote that their categories are different from each other. For example, the category of an apple is fruit, and the category of an eggplant is vegetable, and thus the apple and eggplant may be regarded as different articles from each other due to their different categories. On the contrary, the apple and grapes may be regarded as the same article since they are both fruits (same category).

Next, the process (S320) of analyzing the characteristic information of the first and second purchased articles is carried out. Furthermore, the process (S330) of determining any hazardous effect that the first and the second storage article can have on each other based on the characteristic information of the first and the second storage article is carried out. Then, the process (S340) of outputting alert information according to the determined hazard effect is carried out.

Figure 11:
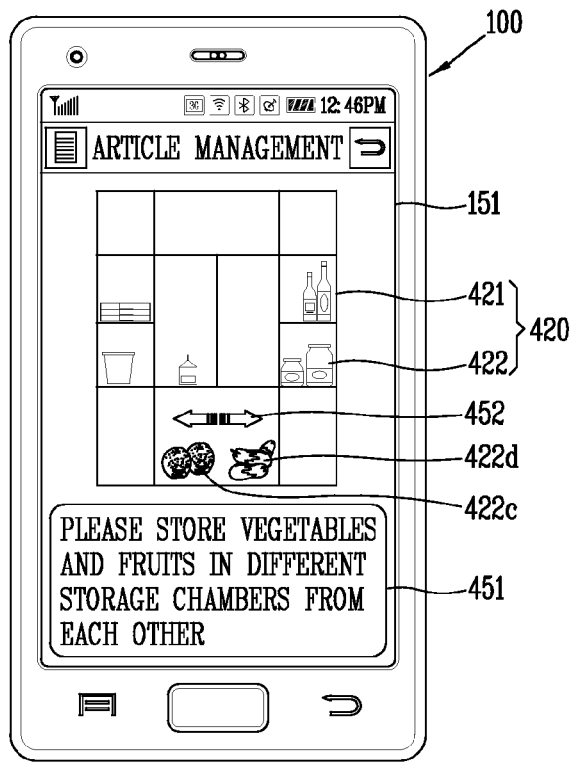
FIG. 11 is an exemplary conceptual view illustrating the operation of a mobile terminal according to the control method of FIG. 10.

FIG. 11 is an exemplary conceptual view illustrating an example of the operation of the mobile terminal 100 according to the control method of FIG. 10. Referring to FIG. 11, when it is determined that a first and a second storage article different from each other (e.g., different in category) are stored in the same storage chamber of the refrigerator, and either one of the first and the second storage article can cause a hazardous or negative effect on the other one or the first and the second storage article cause a hazardous effect on each other due to the same storage location, it may be possible to output alert information on the mobile terminal 100.

For example, as illustrated in the drawing, an alert message 451 such as "Please store vegetables and fruits in different storage chambers from each other" may be displayed through a popup window on the screen of the article management application on the terminal 100. Furthermore, icons 422c, 422d corresponding to these first and the second storage article may be displayed in a highlighted or otherwise distinguishing manner to be separately recognizable from the other icons. Furthermore, an indicator 452 for recommending that the first and the second storage article be separated from each other in storage may be displayed adjacent to the relevant icons 422c, 422d. As mentioned before, any updated storage article information reflecting these changes can be displayed on the screen of the terminal 100.

Figure 12:
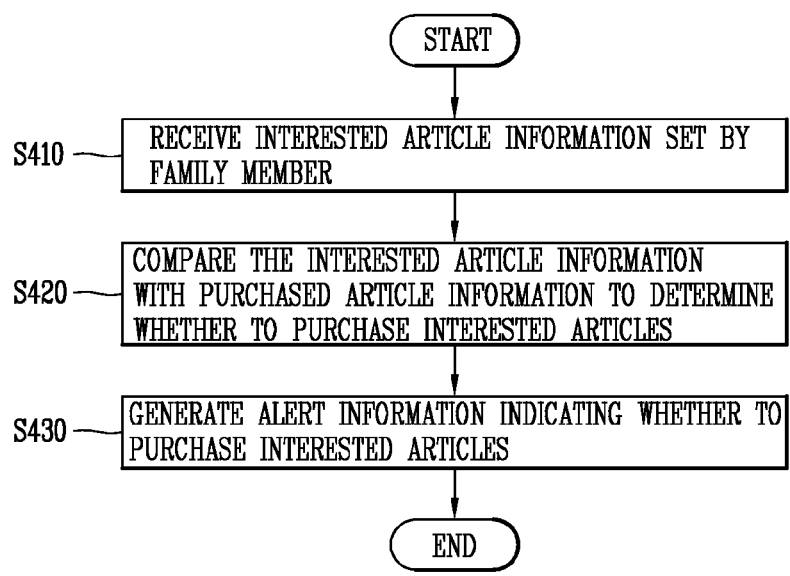
FIG. 12 is a flow chart for explaining a method of controlling a mobile terminal according to an embodiment of the present disclosure.

FIG. 12 is a flow chart for explaining a method of controlling the mobile terminal 100 according to an embodiment of the present disclosure. Referring to FIG. 12, the process (S410) of receiving interested article information set by another person (for example, a family member) other than the user himself or herself is carried out. The interested article information can be information on a preferred article previously determined by the family member, and may be provided from the family member's mobile terminal or the refrigerator 200.

Next, the process (S420) of comparing the purchased article information with the interested article information to determine whether to purchase one or more of the interested articles is carried out. For instance, it may be determined whether or not there is an article corresponding to one or more family member's interested articles among the articles purchased by the user. Then, the process (S430) of generating notification information (hereinafter, referred to as "purchase notification information") indicating whether to purchase the interested article is carried out. The purchase notification information may be transmitted through at least any one of the family member's mobile terminal and the refrigerator 200.

Figure 13:
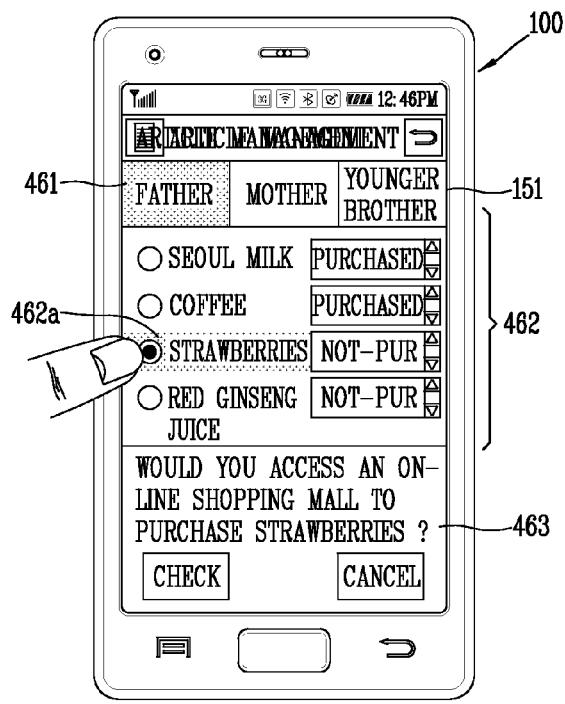
FIG. 13 is an exemplary conceptual view illustrating the operation of a mobile terminal according to the control method of FIG. 12.

FIG. 13 is an exemplary conceptual view illustrating an example of the operation of the mobile terminal 100 according to the control method of FIG. 12. Referring to FIG. 13, the controller 180 may control the display unit 151 of the mobile terminal 100 of the user to display a menu button 461 for selecting a family member during the execution of an article management application. Although a family member is used here, the user of the mobile terminal 100 can set any other people/entity for identifying their interested articles such as a finance's name or a best friend's name or a roommate's name.

When a family member (or another person) is selected through the menu button 461, a list of articles that the father is interested in or likes (interested article information) is displayed on the screen. In the example, the list includes 'Seoul Milk', 'Coffee', 'Strawberries', 'Red Ginseng Juice', etc. The controller 180 may compare the family member's interested article information with the purchased article information (e.g., articles that have been already purchased) to generate purchase notification information 462, and control the display unit 151 to display the purchase notification information 462. For example, when his or her father is selected from the family members including father, mother, and younger brother, the purchase notification information may indicate whether or not each of the interested articles set by his or her father has been purchased. For instance, the controller 180 compares the list of articles that the father is interested in (which is indicated by the interested article information) with the list of articles that has been purchased (which is indicated by the purchased article information), and determines which article among the interested articles has been purchased and which has not been purchased. Such determination is then indicated as, only as an example, "Purchased" (which means that article has been purchased) or "Not-Purchased" (which means that article has not been purchased) adjacent to the article icon on the screen. Such indication is part of the purchase notification information. The user can also override this indication (e.g., by checking the contents of the refrigerator) and manually change the purchase status of each article on the screen.

Here, the selected family member's interested article information may have been stored in advance in the memory 160 or may be requested to another mobile terminal or the refrigerator 200 in response to a touch input to the menu button 461.

The controller 180 may select an item 462a of the purchase notification information 462 in response to the touch input. When an interested article corresponding to the selected item 462a is a non-purchased article, the controller 180 may generate an access menu 463 for accessing an on-line shopping mall providing sales information associated with the relevant article, and control the display unit 151 to display the sales information. For example, when an interested article corresponding to the selected item is non-purchased strawberries, the access menu 463 containing a guide message such as "Would you access an on-line shopping mall to purchase strawberries?" will be displayed thereon. As a result, the user can conveniently conduct online shopping of articles that are desired but have not been purchased, and manage the articles for storage in an efficient manner.

Figure 14:
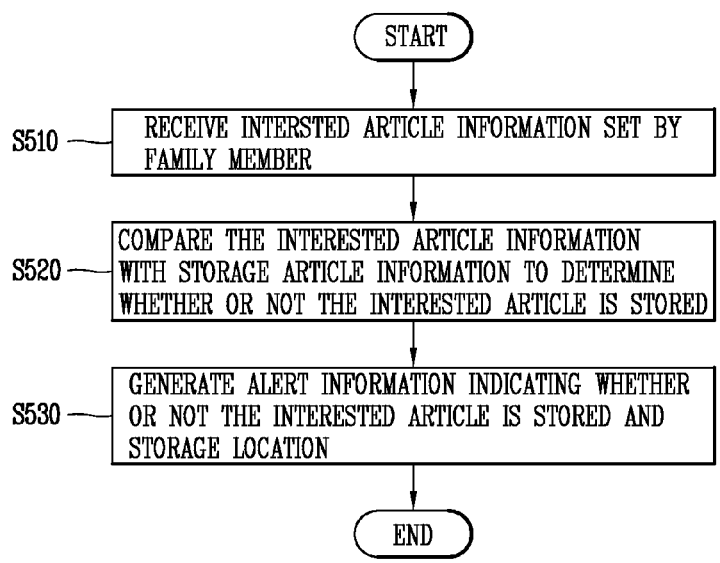
FIG. 14 is a flow chart for explaining a method of controlling a mobile terminal according to an embodiment of the present disclosure.

FIG. 14 is a flow chart for explaining a method of controlling the mobile terminal 100 according to an embodiment of the present disclosure. Referring to FIG. 14, first, the process (S510) of receiving interested article information set by a family member is carried out as illustrated in the control methods of FIGS. 12 and 13.

Next, the process (S520) of comparing the storage article information with the interested article information to determine whether or not the interested article is stored therein is carried out. More specifically, it may be determined whether or not there is an article corresponding to the family member's interested article among the articles currently stored in the refrigerator 200. Then, the process (S530) of generating notification information (hereinafter referred to as "storage notification information") indicating whether or not the interested article is stored in the refrigerator and indicating the storage location thereof within the refrigerator is carried out. The storage notification information may be transmitted through at least any one of the family member's mobile terminal and the refrigerator 200.

Figure 15:
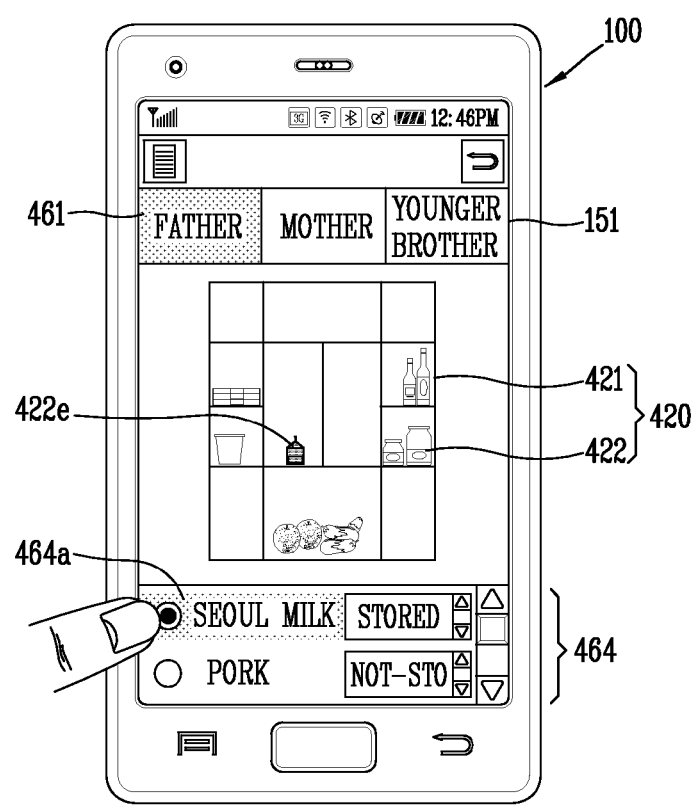
FIG. 15 is an exemplary conceptual view illustrating the operation of a mobile terminal according to the control method of FIG. 14.

FIG. 15 is an exemplary conceptual view illustrating an example of the operation of the mobile terminal 100 according to the control method of FIG. 14. Referring to FIG. 15, when the user selects a specific family member (father), the controller 180 may compare the family member's interested article information selected through the menu button 461 with the storage article information to generate storage notification information 464, and control the display unit 151 to display the storage notification information 464 as shown. For example, when his or her father is selected from the family members including father, mother, and younger brother, the storage notification information 464 may indicate whether or not each of the interested articles set by his or her father has been stored in the refrigerator 200. The storage notification information may display a list of articles that the father is interested in and then indicate whether or not each of these articles is stored in the refrigerator.

The controller 180 may select an item 464a of the storage notification information 464 in response to the touch input. When an interested article corresponding to the selected item 464a (e.g., 'Seoul Milk') is stored in the refrigerator 200, the controller 180 may display a guide message (not shown) to indicate the storage location of the relevant storage article within the refrigerator 200. Furthermore, the controller 180 may highlight an icon 422e corresponding to the relevant storage article ('Seoul Milk') in the displayed storage location information 420 to be distinguished from the other icons. As a result, the user may intuitively recognize which chamber among the plurality of storage chambers 210 stores therein the interested article corresponding to the selected item 464a.

Figure 16:
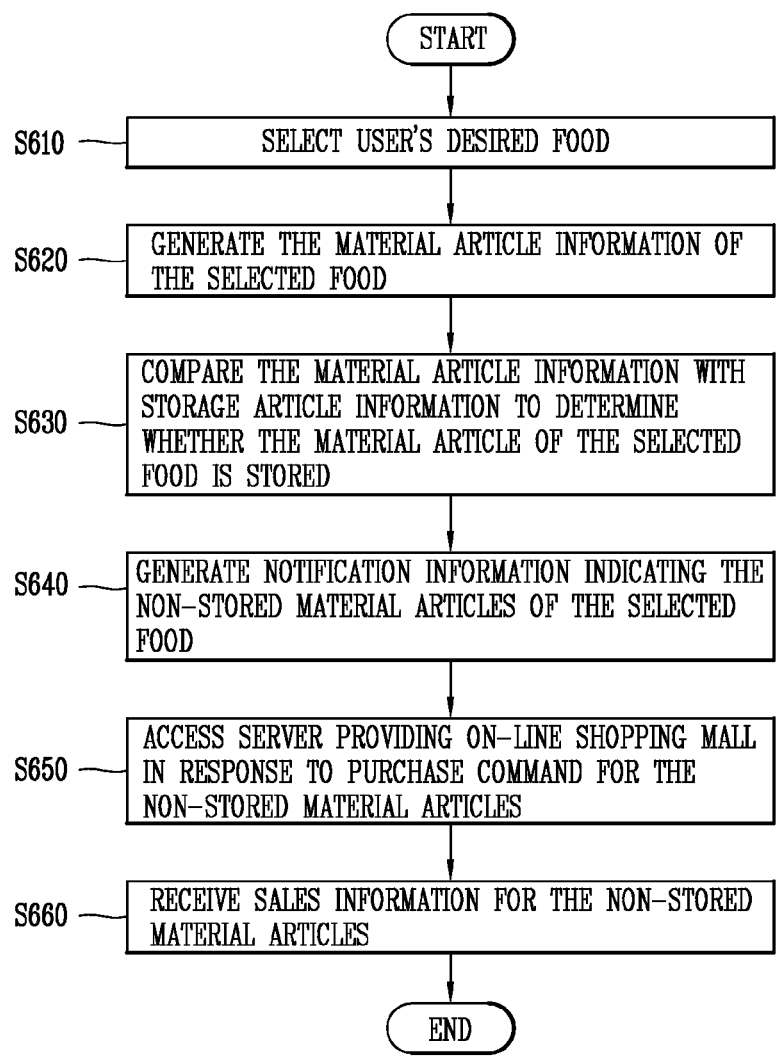
FIG. 16 is a flow chart for explaining a method of controlling a mobile terminal according to an embodiment of the present disclosure.

FIG. 16 is a flow chart for explaining a method of controlling the mobile terminal 100 according to an embodiment of the present disclosure. Referring to FIG. 16, first, the process (S610) of selecting a user's desired food or dish from a plurality of foods according to the user's input is carried out. Next, the process (S620) of generating material article information of the selected food based on one or more cooking methods for a plurality of foods is carried out. Here, the cooking methods may be stored in the memory 160 in advance or provided through the Internet. The material article information for a specific food/dish includes a list of ingredients/materials used to make the specific food/dish.

Then, the process (S630) of comparing the storage article information with the material article information to determine whether the material article of the selected food/dish is stored is carried out. Based on a result of this determination, the process (S640) of detecting the non-stored material article of the selected food and thereby generating notification information indicating the non-stored material article is carried out. The non-stored material article of the dish is a material or ingredient that is currently not stored in the refrigerator 200 among the ingredients used to make the dish.

Next, the process (S650) of accessing a server for providing on-line shopping malls in response to a purchase command for the non-stored material article is carried out. The purchase command is preferably made by the user upon reviewing the notification information which indicates that certain ingredients needed to make the desired dish are currently not stored in the refrigerator 200. Furthermore, the process (S660) of receiving sales information for the non-stored material article from the server is carried out. For instance, the server may identify one or more prices of the non-stored material article as well as any other information, e.g., current availability in one or more physical grocery stores or online grocery stores, etc. as the sales information. Upon reviewing the sales information, the user can purchase the desired ingredient, e.g., via online. Once the purchase is completed, then the controller 180 will update the purchased article information based on the electronic receipt of the purchased article, and update the storage article information and any other applicable information as discussed above in the various embodiments. As a result, a systematic and efficient article storage management process is provided by the present invention.

Figure 17:
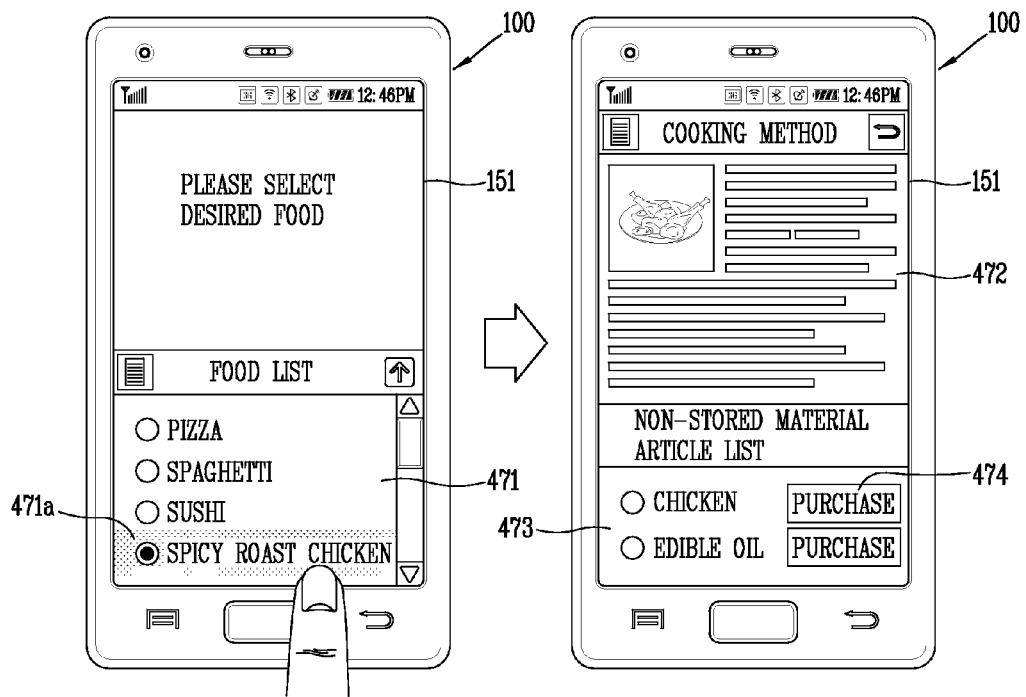
FIG. 17 is an exemplary conceptual view illustrating the operation of a mobile terminal according to the control method of FIG. 16.

FIG. 17 is an exemplary conceptual view illustrating an example of the operation of the mobile terminal 100 according to the control method of FIG. 16. Referring to FIG. 17, the controller 180 may control the display unit 151 to display a food list 471 along with a guide message such as "Please select your desired food" during the execution of an article storage application.

When an item 461*a* (e.g., 'Spicy Roast Chicken') of the food list 471 is selected in response to a touch input, the controller 180 may control the display unit 151 to display a cooking method 472 for the selected food ('Spicy Roast Chicken'), a non-stored material article list 473 for the selected food and cooking method (which can identify a list of materials or ingredients that are not stored in the refrigerator), a menu button 474 for purchasing the non-stored material articles, and the like.

The controller 180 may analyze the cooking method 472 for the selected food to find material articles required for the selected food, and determine whether the material articles are stored in the refrigerator 200 based on the storage article information. As a result of the determination, the controller 180 may generate the non-stored material article list 473.

Similar to other examples above, the user then can purchase any material article from the non-stored material article list 473. For instance, the controller 180 may access a server for providing on-line shopping malls in response to a purchase command received through the menu button 474 to acquire sales information for the relevant material articles. And the user can purchase the desired material article online and the controller 180 can update any information in view of this purchase.

Figure 18:
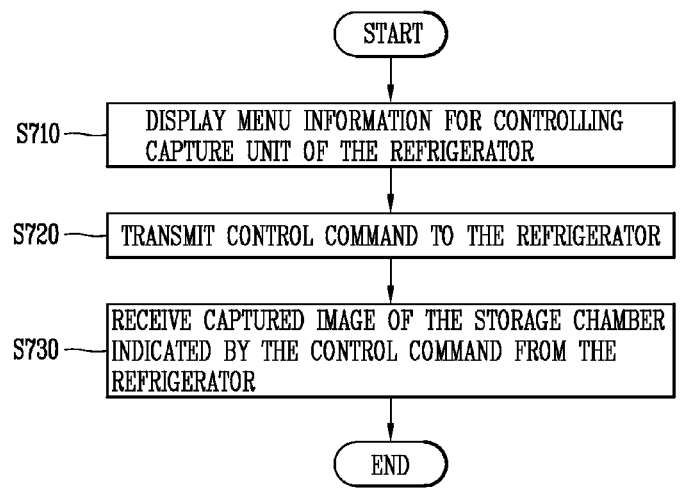
FIG. 18 is a flow chart for explaining a method of controlling a mobile terminal according to an embodiment of the present disclosure.

FIG. 18 is a flow chart for explaining a method of controlling the mobile terminal 100 according to an embodiment of the present disclosure. Referring to FIG. 18, first, the process (S710) of displaying menu information for controlling the capture unit of the refrigerator 200 during the execution of the article management application is carried out. Next, when a control command is received through the menu information, the process (S720) of transmitting the control command to the refrigerator 200 is carried out. Then, the process (730) of receiving a captured image of the refrigerator's storage chamber indicated by the control command is carried out.

Figure 19:
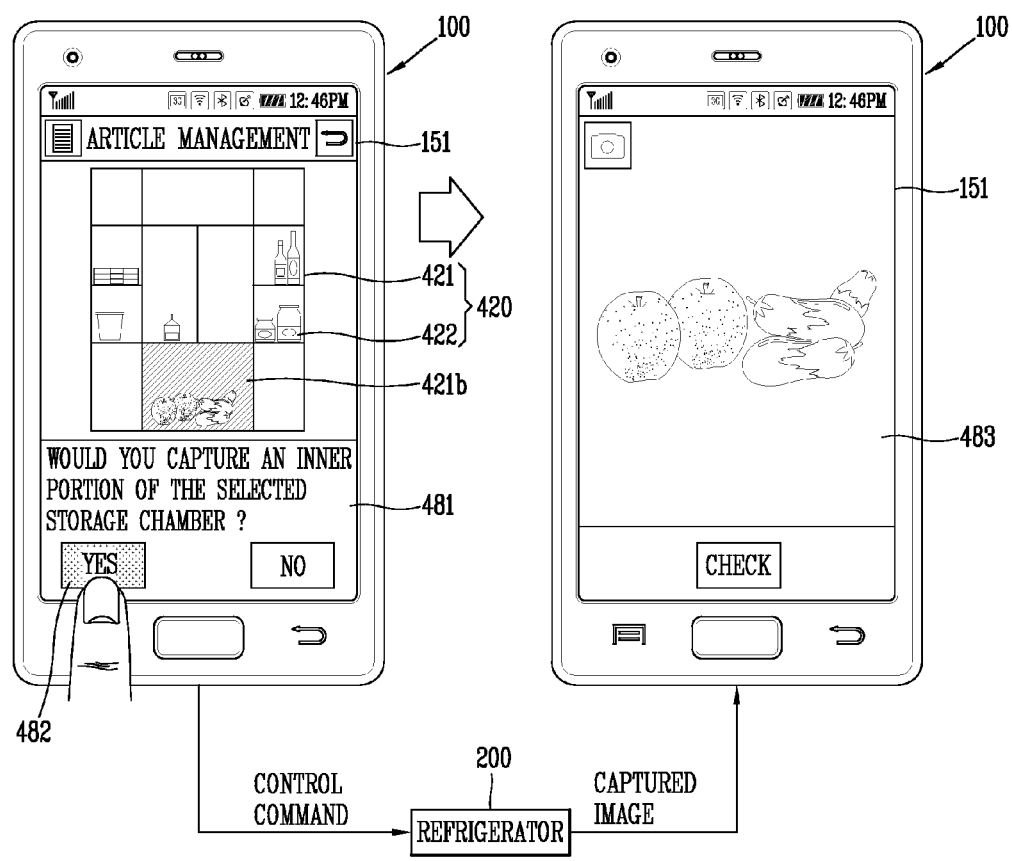
FIG. 19 is an exemplary conceptual view illustrating the operation of a mobile terminal according to the control method of FIG. 18.

FIG. 19 is an exemplary conceptual view illustrating an example of the operation of the mobile terminal 100 according to the control method of FIG. 18. Referring to FIG. 19, the controller 180 may control the display unit 151 to display menu information 481, 482 for controlling the capture unit of the refrigerator 200 along with the storage location information 420 during the execution of the article management application. The menu information 481, 482 may include a guide message 481, for example, "Would you like to capture an inside image of the selected storage chamber?" and a capture button 482 (e.g., yes or no).

The storage chamber for which the inner portion thereof is to be captured may be selected by a touch input to the storage chamber image 421. For example, a storage chamber corresponding to the touched region 421*b* of the storage chamber image 421 of the refrigerator 200 displayed on the screen of the mobile terminal 100 may be selected. At this time, the touched region 421*b* may be displayed in a highlight manner to indicate that the relevant storage chamber is selected. The menu information 481, 482 may be displayed in response to the selection of the storage chamber.

Though not shown in the drawing, an indicator indicating whether or not a camera module capable of capturing an image is provided at the relevant storage chamber of the refrigerator 200 may be displayed in each region of the storage chamber image 421. Owing to this, the user can intuitively recognize a storage chamber which is capable of capturing its inside chamber image.

When a touch input to the capture button 482 is sensed, the controller 180 may generate a control command to transmit it to the refrigerator 200. The capture unit of the refrigerator 200 may capture an inside of the storage chamber selected from the plurality of storage chambers to acquire an image thereof in response to the control command received from the mobile terminal 100. At this time, when the inner portion (or inside) of the storage chamber is dark, an illumination unit of the refrigerator 200 formed to emit light may be driven.

The controller 180 may then receive a captured image 483 from the refrigerator 200 in response to a control command, and control the display unit 151 to display the captured image. The captured image 483 can be an image of the inside of the selected storage chamber so that the user can view what is actually stored in the selected storage chamber. At this time, the captured image 483 may be implemented in the form of still images as well as moving images according to real-time capture. The controller 180 of the mobile terminal 100 can analyse the captured image 483 to determine articles that are currently stored in the selected storage chamber of the refrigerator 200 and update the storage article information based on this determination. In this manner, the storage article information can be periodically or at any desired time updated to reflect the current storage status of each of the storage chambers of the refrigerator.

Figure 20:
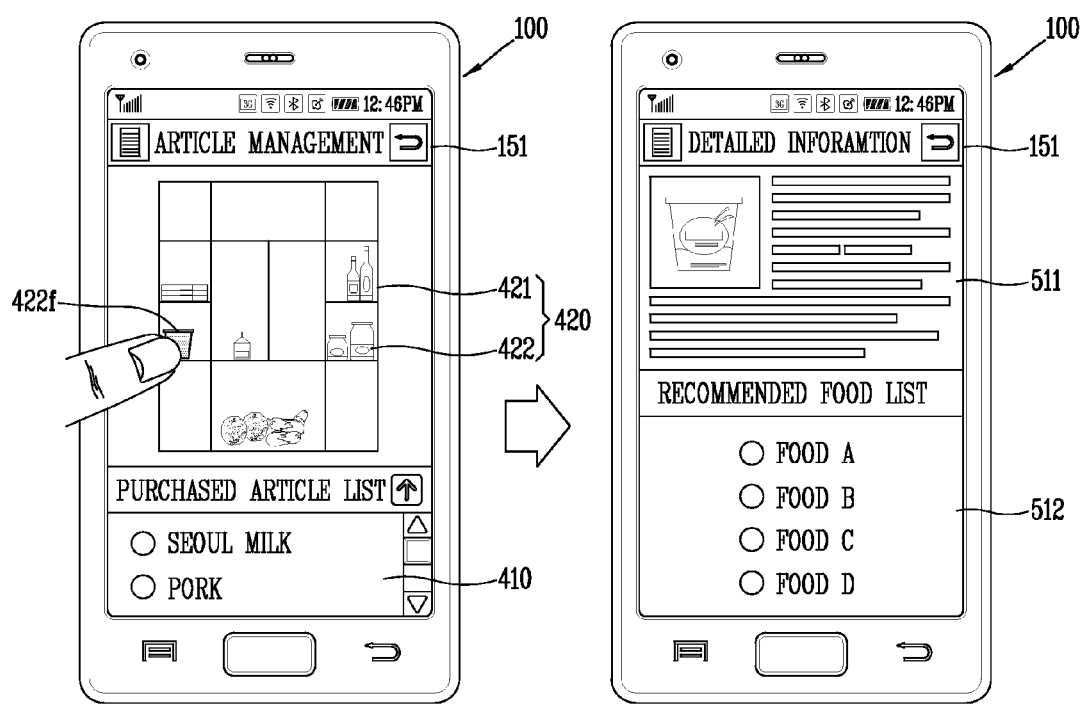
FIGS. 20 through 22 are conceptual views illustrating an example of using storage article information according to an embodiment of the present disclosure.
Figure 21:
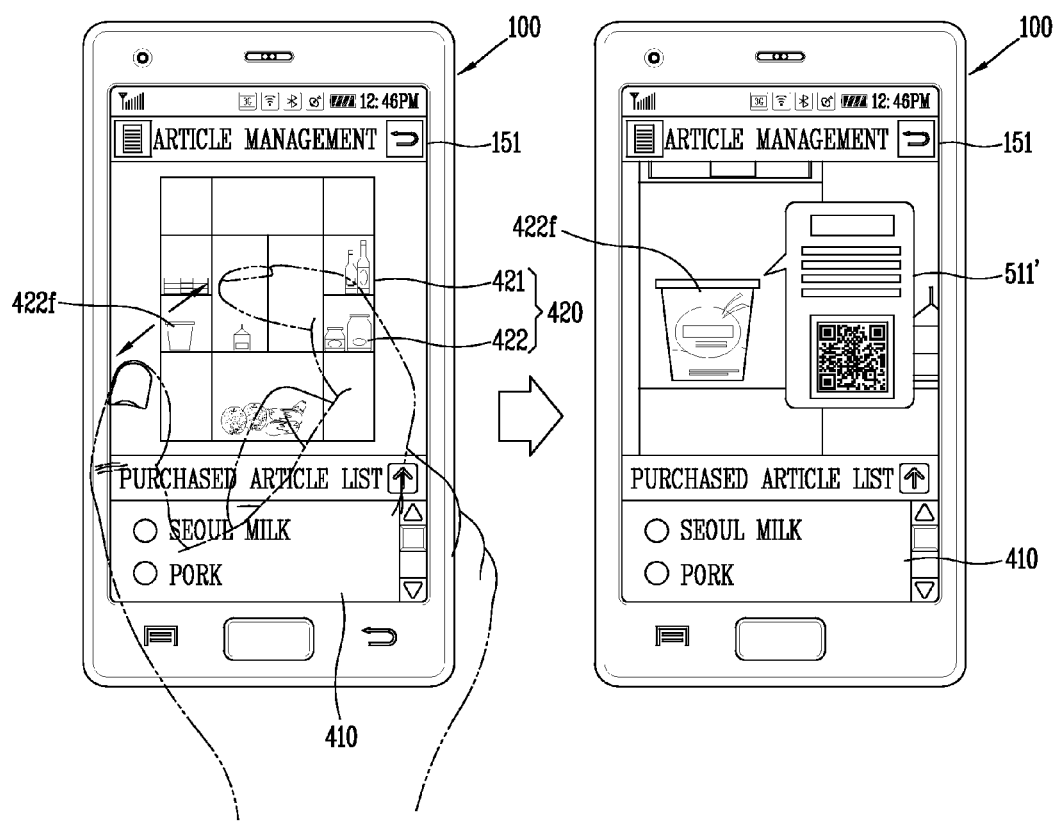
Figure 22:
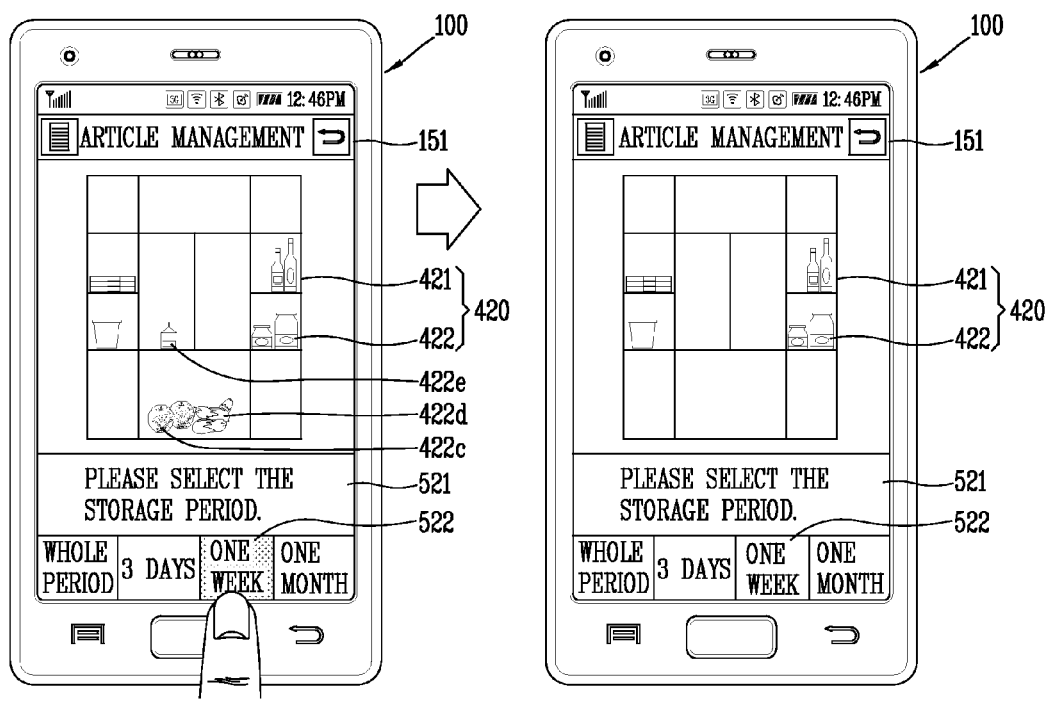

FIGS. 20 through 22 are conceptual views illustrating an example of using storage article information according to an embodiment of the present disclosure.

Referring to FIG. 20, it is illustrated a user interface for providing the storage article information, for example, supplementary information on a storage article using an icon disposed on the storage chamber image 421.

When an icon 422*f* is selected in response to a touch input, the controller 180 may control the display unit 151 to display the detailed information 511, a recommended food list 512, and the like of a storage article corresponding to the selected icon 422*f*. The detailed information 511 may include information on the name, category, quantity, capacity, storage condition and the like of the selected storage article of the icon 422f. The recommended food list 512 indicate foods for which the selected storage article is used as a material article. For instance, the food list 512 may include a list of food dishes that use the selected food article as a main ingredient. When an item or food from the recommended food list 512 is selected, the detailed cooking method for the selected food will be displayed thereon.

Referring to FIG. 21, another example of a user interface for providing supplementary information on a storage article is provided. The controller 180 may enlarge the storage chamber image 421 or a portion thereof in response to a touch input (for example, pinch-in gesture input). For instance, the user can touch a desired area of the image 421 using the first two fingers and then increase the distance between such touch points. This would be considered an enlarge touch input. Other gestures or touch inputs can be used as the enlarge touch input. The area touched or identified by the enlarge touch input is then enlarged on the screen of the mobile terminal 100 as shown on the right side of the drawing. As the storage chamber image 421 is enlarged, the icon 422f disposed at the area touched or identified by the enlarge touch input may be conspicuously displayed. Furthermore, the detailed information 511' of a storage article corresponding to the conspicuously displayed icon 422f may be also displayed thereon.

Referring to FIG. 22, a user interface for selecting and displaying at least part of the storage article information according to the user's input is provided according to an example of the present invention.

During the execution of the article management application, the controller 180 may control the display unit 151 to display menu information 521, 522 for defining reference information applied to select the plurality of storage articles of the refrigerator 200. As an example of the reference information, the article category, purchase frequency, use frequency, preferred article, storage period, recommended storage period, purchase place, purchase time, purchase price, settlement means/methods, and the like, set by the user or family member, may be defined.

Here, the preferred article may be manually set by the user or family member or automatically set based on the purchase history information according to the analysis of a plurality of electronic receipts of the user or family member. For example, the controller 180 may find which purchaser has mostly purchased which article using the purchase history information and thereby determine a preferred article for each family member.

Here, an example of the storage period as the reference information will be described. As illustrated in the drawing, the menu information 521, 522 may include a guide message such as "Please select the storage period", a menu button for selecting a storage period condition, and the like.

When a storage period condition is selected according to a touch input to the menu button 522, the controller 180 may identify at least one storage article suitable for the selected storage period condition and display the identified at least one storage article on the storage chamber image 421 without other storage articles. For instance, when at least one storage article is selected as being suitable for the selected storage period condition in a state that icons corresponding to all storage articles stored in the refrigerator 200 are displayed thereon, the controller 180 may control the display unit 151 to allow icons 422c, 422d, 422e corresponding to the remaining storage articles, other than the selected at least one storage article, to disappear from the screen image. As such, the icons 422c, 422d, 422e corresponding to the articles that are not suitable for the selected storage period are removed from the screen image.

Furthermore, the controller 180 may control the display unit 151 to display an icon corresponding to the selected at least one storage article (suitable for the selected storage period) to be distinguished from icons corresponding to the remaining storage articles. For example, at least one of the brightness, color, shape, three-dimensional depth value, and the like of an icon corresponding to the selected at least one storage article may be changed, and/or a graphic effect such as highlight, blink and the like may be provided to the relevant icon.

According to an embodiment of the present disclosure, information on the user's interested article may be transmitted to another mobile terminal. At this time, the interested article information may include a message for requesting the recipient to purchase the user's interested article, instead of the user.

The user's interested article may be designated using at least one of icons disposed on the storage chamber image 421. Furthermore, the user's interested article may be designated using recommended menu information for presenting at least one recommended article. The recommended menu information may be displayed in response to a touch input to a space in which any icon is not disposed in the storage chamber image 421.

According to an embodiment of the present disclosure, the controller 180 may check the recommended expiration date of a storage article, and detect a storage article for which the recommended expiration date has passed or the recommended expiration date is expected to come within a predetermined period of time. The controller 180 may highlight or delete an icon corresponding to the detected storage article to be distinguished from icons corresponding to the other storage articles. Furthermore, the controller 180 may control the display unit 151 to display notification information for persuading the user to discontinue using the relevant storage article since the recommended expiration date has been passed.

On the other hand, the controller 180 may designate a storage article for which the recommended expiration date has been passed as an interested article to purchase in response to the user's input. In this case, as described above, the controller 180 may transmit a message for requesting the recipient to purchase the interested article, instead of the user.

Figure 23:
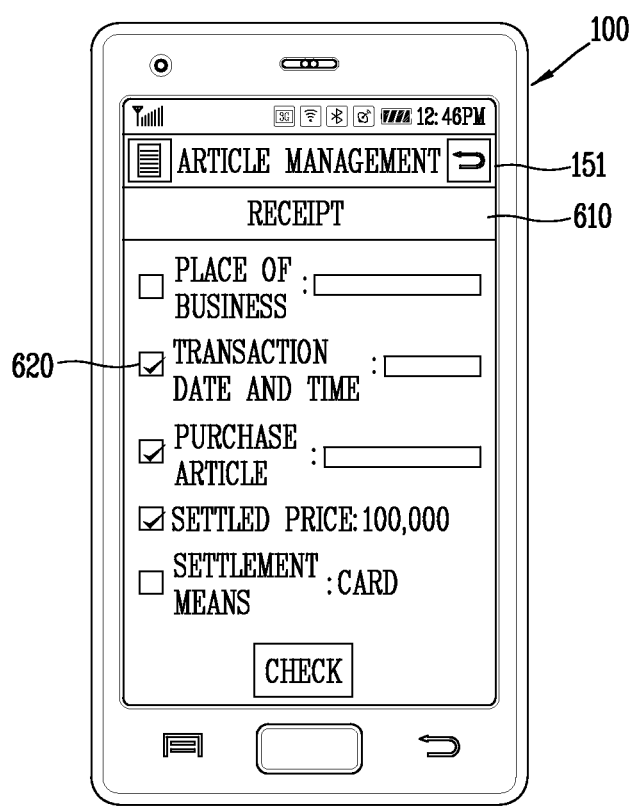
FIG. 23 is a conceptual view illustrating an example of a user interface of a mobile terminal associated with an electronic receipt according to an embodiment of the present disclosure.

FIG. 23 is a conceptual view illustrating an example of a user interface of the mobile terminal 100 associated with an electronic receipt according to an embodiment of the present disclosure.

The controller 180 may control the display unit 151 to display an electronic receipt 610 and a selected object 620 received from the settlement terminal 300 during the execution of the article management application. The electronic receipt 610 may include items such as a name of business premise, a transaction date and time, a purchased article, a settled price, a settlement means/method, and the like. As an object used to select an item of the electronic receipt 610, the object 620 may be implemented in the form of a check box, for example.

Then, the controller 180 may generate the purchased article information based on information corresponding to the selected items of the electronic receipt 610. It denotes that part of the information provided by the electronic receipt 610 may be selectively used to generate the purchased article information.

According to an embodiment of the present disclosure, the information of the electronic receipt 610 to be contained in the purchased article information may be automatically selected based on a predetermined algorithm. For instance, the controller 180 may select a purchased article by determining whether the purchased article is suitable to be stored in the refrigerator. Then, the controller 180 may generate the purchased article information on the selected purchased articles.

According to an embodiment of the present disclosure, information according to the user's input may be added to the purchased article information. For example, when the expiration date information on the purchased article is not detected from the electronic receipt 610, the controller 180 may add the expiration date information determined by the user's input to the purchased article information in association with the relevant purchased article.

According to an embodiment of the present disclosure, a plurality of electronic receipts may be stored and managed in the memory 160. Though one electronic receipt is illustrated in FIG. 23, the controller 180 may control the display unit 151 to sequentially display a plurality of electronic receipts based on their issued history, respectively, in response to a touch input. Further the electronic receipts per each different person (e.g., family members) may be stored in the terminal 100.

Figure 24:
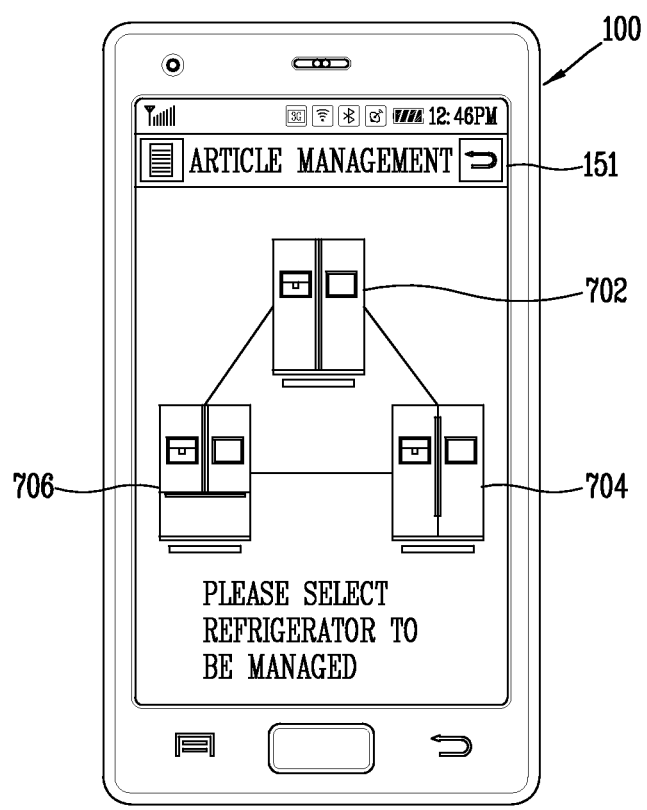
FIG. 24 is a conceptual view illustrating an example of a user interface provided when a mobile terminal according to an embodiment of the present disclosure is connected to a plurality of refrigerators.

FIG. 24 is a conceptual view illustrating an example of a user interface provided when the mobile terminal 100 according to an embodiment of the present disclosure is connected to a plurality of refrigerators. Referring to FIG. 24, when the mobile terminal 100 is configured to communicate with the plurality of refrigerators, the controller 180 may control the display unit 151 to display a plurality of device icons 702-706 corresponding to the plurality of refrigerators.

When any one of the plurality of device icons 702-706 is selected, the controller 180 may receive and manage the storage article information from the (selected) refrigerator corresponding to the selected device icon. The above various operations and methods associated with the refrigerator 200 can be performed for this selected refrigerator. Further, the refrigerators may exchange information directly to each other or via the mobile terminal 100. Further, instead of the refrigerators, other appliances may be used.

According to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to a mobile terminal disclosed herein, and all or part of each embodiment may be selectively combined and configured to make various modifications thereto.

What is claimed is:

1. A mobile terminal for communicating with a refrigerator, the mobile terminal comprising:
a communication unit configured to receive an electronic receipt containing purchased article information from a settlement terminal, and to receive storage article information from the refrigerator, the purchased article information identifying at least one purchased article that has been purchased, the storage article information identifying at least one stored article that is stored in the refrigerator;
a display unit configured to display the purchased article information on a first region of the display unit and the storage article information on a second region of the display unit; and
a controller configured to:
detect an input applied to the first region of the display unit;
update the storage article information by adding the displayed purchased article information to the second region on which the storage article information is displayed, in response to the detection of the input; and
transmit the updated storage article information to at least one of the refrigerator and another mobile terminal through the communication unit.

2. The mobile terminal of claim 1, wherein the refrigerator has a plurality of storage chambers in which a plurality of articles including the at least one stored article are stored, and
the storage article information further includes storage location information identifying at least one of the plurality of storage chambers in which each of the plurality of articles are stored.

3. The mobile terminal of claim 2, wherein the communication unit receives environmental information of the plurality of storage chambers from the refrigerator, and
the controller receives a selection of a purchased article among the at least one purchased article, and displays on the display unit at least one recommended storage chamber, among the plurality of storage chambers, for storing the selected purchased article based on the environmental information.

4. The mobile terminal of claim 2, wherein the controller displays, on the second region of the display unit, a storage chamber image indicating the plurality of storage chambers of the refrigerator, and displays, on the storage chamber image, a plurality of icons indicating the plurality of articles stored in the plurality of storage chambers.

5. The mobile terminal of claim 4, wherein when one of the plurality of icons is selected, the display unit displays detailed information of a stored article corresponding to the selected icon.

6. The mobile terminal of claim 4, wherein when one of the plurality of icons is selected, the controller displays the selected icon to be distinguished from the other icons or allows the other icons to disappear from the display unit, based on reference information associated with the plurality of articles.

7. The mobile terminal of claim 2, wherein when first and second articles are stored in the refrigerator, the controller determines a presence of a hazardous effect on the stored first and the second articles based on characteristic information of the first and the second articles, and outputs alert information according to the determination result.

8. The mobile terminal of claim 2, wherein the controller is further configured to:
receive interested article information identifying at least one interested article that a user is interested in purchasing,
determine whether to purchase any of the at least one interested article by comparing the purchased article information with the interested article information, and
generate notification information indicating whether to purchase any interested article based on the determination result.

9. The mobile terminal of claim 8, wherein when determining whether to purchase any of the at least one interested article, the controller determines whether any interested article is already stored in the refrigerator based on the article storage information, and if the interested article is already stored in the refrigerator, the controller further outputs an indication that the interested article is stored in the refrigerator and a storage location of the interested article within the refrigerator.

10. The mobile terminal of claim 2, further comprising:
a memory configured to store recipe information for a plurality of foods,
wherein when a user's desired food is selected from the plurality of foods, the controller generates material article information of the selected food based on the recipe information, compares the storage article information with the material article information to determine whether any material for the selected food has been purchased or is stored in the refrigerator, and generates notification information according to this determination result.

11. The mobile terminal of claim 8, wherein the communication unit is further configured to:
communicate with an external device for providing at least one on-line shopping site in response to acknowledgement information to the notification information, and
receive, from the external device, sales information for any material article which was purchased and is not stored in the refrigerator.

12. The mobile terminal of claim 2, wherein when the refrigerator further includes a capture unit to capture an image of an inner portion of at least one of the plurality of storage chambers, the display unit displays menu information for controlling the capture unit, and
the communication unit receives from the refrigerator a captured image of at least one of the plurality of storage chambers generated by the capture unit, based on a user's manipulation of the menu information displayed on the display unit.

13. The mobile terminal of claim 1, further comprising a memory configured to store therein at least one of the following for managing use of the refrigerator:
a plurality of different storage article information respectively for a plurality of different users of the refrigerator,
a plurality of different purchased article information respectively for the plurality of different users of the refrigerator, and
a plurality of different interested article information respectively for the plurality of different users of the refrigerator.

14. A method for communicating with a refrigerator using a mobile terminal, the mobile terminal including a communication unit, a display unit and a controller, the method comprising:
receiving, by the communication unit, an electronic receipt containing purchased article information from a settlement terminal, the purchased article information identifying at least one purchased article that has been purchased;
receiving storage article information from the refrigerator, the storage article information identifying at least one stored article that is stored in the refrigerator;
displaying the purchased article information on a first region of the display unit and the storage article information on a second region of the display unit;
detecting an input applied to the first region of the display unit;
updating, by the controller, the storage article information by adding the displayed purchased article information to the second region on which the storage article information is displayed, in response to the detection of the input; and
transmitting the updated storage article information to at least one of the refrigerator and another mobile terminal through the communication unit.

15. The method of claim 14, wherein the refrigerator has a plurality of storage chambers in which a plurality of articles including the at least one stored article are stored, and
the storage article information further includes storage location information identifying at least one of the plurality of storage chambers in which each of the plurality of articles are stored.

16. The method of claim 15, further comprising:
receiving, by the communication unit, environmental information of the plurality of storage chambers from the refrigerator;
receiving, by the controller, a selection of a purchased article among the at least one purchased article; and
displaying, on the display unit, at least one recommended storage chamber, among the plurality of storage chambers, for storing the selected purchased article based on the environmental information.

17. The method of claim 15, further comprising:
displaying, on the second region of the display unit, a storage chamber image indicating the plurality of storage chambers of the refrigerator; and
displaying, on the storage chamber image, a plurality of icons indicating the plurality of articles stored in the plurality of storage chambers.

18. The method of claim 17, wherein when one of the plurality of icons is selected, the method comprises displaying, on the display unit, detailed information of a stored article corresponding to the selected icon.

19. The method of claim 17, wherein when one of the plurality of icons is selected, the controller displays the selected icon to be distinguished from the other icons or allows the other icons to disappear from the display unit, based on reference information associated with the plurality of articles.

20. The method of claim 15, further comprising:
when first and second articles are stored in the refrigerator, determining a presence of a hazardous effect on the stored first and the second articles based on characteristic information of the first and the second articles; and
outputting alert information according to this determination result.

21. The method of claim 15, further comprising:
receiving interested article information identifying at least one interested article that a user is interested in purchasing;
determining whether to purchase any of the at least one interested article by comparing the purchased article information with the interested article information; and
generating notification information indicating whether to purchase any interested article based on this determination result.

22. The method of claim 21, wherein the step of determining whether to purchase any of the at least one interested article, determines whether any interested article is already stored in the refrigerator based on the article storage information, and
if the interested article is already stored in the refrigerator, the method further comprises outputting an indication that the interested article is stored in the refrigerator and a storage location of the interested article within the refrigerator.

23. The method of claim 15, wherein the mobile terminal further includes a memory configured to store recipe information for a plurality of foods, and wherein when a user's desired food is selected from the plurality of foods, the method further comprises:

generating material article information of the selected food based on the recipe information;

comparing the storage article information with the material article information to determine whether any material for the selected food has been purchased or is stored in the refrigerator; and generating notification information according to this determination result.

24. The method of claim 21, further comprising:

communicating with an external device for providing at least one on-line shopping site in response to acknowledgement information to the notification information; and receiving, from the external device, sales information for any material article which was purchased and is not stored in the refrigerator.

25. The method of claim 15, wherein when the refrigerator further includes a capture unit to capture an image of an inner portion of at least one of the plurality of storage chambers, the method further comprises:

displaying, on the display unit, menu information for controlling the capture unit; and receiving from the refrigerator a captured image of at least one of the plurality of storage chambers generated by the capture unit, based on a user's manipulation of the menu information displayed on the display unit.

26. The method of claim 15, further comprising:

storing, in a memory of the mobile terminal, at least one of the following for managing use of the refrigerator:

a plurality of different storage article information respectively for a plurality of different users of the refrigerator, a plurality of different purchased article information respectively for the plurality of different users of the refrigerator, and a plurality of different interested article information respectively for the plurality of different users of the refrigerator.

* * * * *